United States Patent
Reiss et al.

(10) Patent No.: US 12,147,393 B2
(45) Date of Patent: Nov. 19, 2024

(54) ENABLING COLLABORATION ON AN OBJECT FROM A BACKUP SERVICE THROUGH INTEGRATION WITH AN OBJECT SYNCHRONIZATION SERVICE

(71) Applicant: Dropbox, Inc., San Francisco, CA (US)

(72) Inventors: Kelson Reiss, San Francisco, CA (US); Yoeun Pen, North Bend, WA (US); Alexandru Grigoras, Lake Worth, FL (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 17/894,539

(22) Filed: Aug. 24, 2022

(65) Prior Publication Data
US 2024/0045838 A1    Feb. 8, 2024

Related U.S. Application Data

(60) Provisional application No. 63/370,773, filed on Aug. 8, 2022.

(51) Int. Cl.
| | |
|---|---|
| *G06F 16/00* | (2019.01) |
| *G06F 9/54* | (2006.01) |
| *G06F 16/11* | (2019.01) |
| *G06F 16/176* | (2019.01) |
| *G06F 16/178* | (2019.01) |

(52) U.S. Cl.
CPC .......... *G06F 16/178* (2019.01); *G06F 9/547* (2013.01); *G06F 16/122* (2019.01); *G06F 16/176* (2019.01)

(58) Field of Classification Search
CPC ..... G06F 16/178; G06F 16/122; G06F 16/176
USPC .......................................................... 707/610
See application file for complete search history.

(56) References Cited

U.S. PATENT DOCUMENTS

| | | |
|---|---|---|
| 8,099,605 B1 | 1/2012 | Billsrom et al. |
| 8,694,744 B1 | 4/2014 | Raj et al. |
| 8,996,884 B2 | 3/2015 | Hartley et al. |
| 9,501,546 B2 | 11/2016 | Bhargava et al. |
| 9,652,344 B2 | 5/2017 | Hack et al. |
| 10,009,233 B2 | 6/2018 | Mihovilovic |
| 11,334,555 B2 | 5/2022 | Strong et al. |
| 2019/0199795 A1 | 6/2019 | He |
| 2021/0240732 A1* | 8/2021 | Kleinpeter .......... G06F 16/9027 |
| 2022/0121680 A1* | 4/2022 | Yerfule ............... G06F 16/1824 |

\* cited by examiner

*Primary Examiner* — Chelcie L Daye
(74) *Attorney, Agent, or Firm* — Polsinelli

(57) ABSTRACT

The present technology is a backup service that can provide a menu of collaboration options that can be selected within the backup service for implementation by a synchronization service. In such an embodiment, when a user selects a collaboration option from the menu of collaboration options in the backup service, the backup service can call the synchronization service to copy the backup object into the synchronization service and implement the selected collaboration option. This can provide a benefit of reducing the number of user interfaces that need to be displayed and interacted with in order to carry out the intent of the user to offer a copy of the backup object for collaboration. The present technology also provides improved user interfaces.

20 Claims, 17 Drawing Sheets

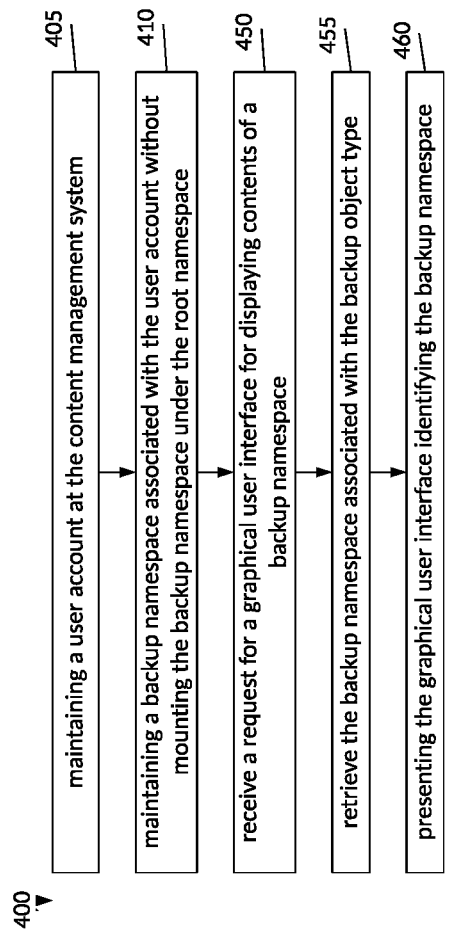

Dropbox Backup — 530

Personal Dropbox Backups

📀 Passport 2TB SDD — 539
Last backed up 1/01/21

Acme Dropbox Backups

🍎 Mac — 537
Last backed up today at 4:30pm

Add a backup

Plug in an external drive or install Dropbox on an additional computer

---

Upgrade  ⓘ

Mac — 537

ⓘ Currently backing up. 58% backed up. 1,300 files using 50 GB in Dropbox.

[ View contents ]

Manage backups

Live progress and status of this backup  [ View progress ]

Previously backed up files and changes  [ View history ]

To prioritize a file to back up, right-click it in [Finder/Explorer] and choose Sync now  [ Prioritize files ]

To remove a file from this back up, right-click it in [Finder/Explorer] and choose Don't sync to Dropbox  [ Skip files ]

Recover files

View and recover recently deleted files  [ View deleted files ]

To view and recover earlier versions of a file, right-click it in

FIG. 7

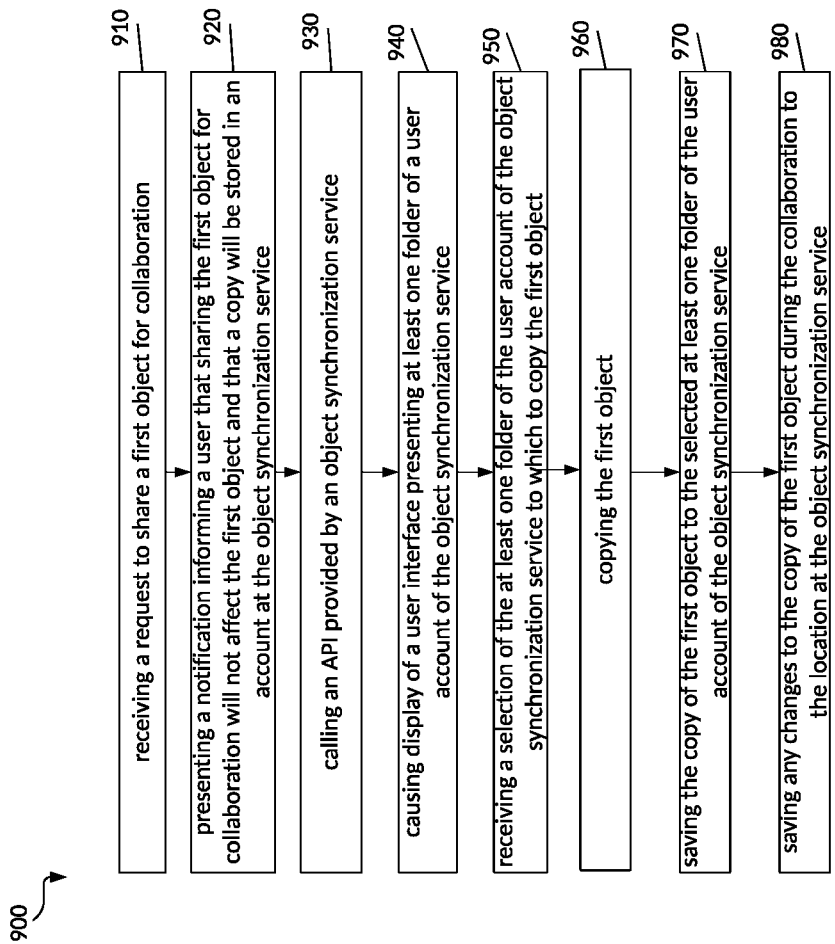

ENABLING COLLABORATION ON AN OBJECT FROM A BACKUP SERVICE THROUGH INTEGRATION WITH AN OBJECT SYNCHRONIZATION SERVICE

CROSS-REFERENCE TO RELATED APPLICATIONS

This application claims priority to U.S. provisional application No. 63/370,773, filed on Aug. 8, 2022, entitled ENABLING COLLABORATION ON AN OBJECT FROM A BACKUP SERVICE THROUGH INTEGRATION WITH AN OBJECT SYNCHRONIZATION SERVICE, which is expressly incorporated by reference herein in its entirety.

TECHNICAL FIELD

The present technology pertains to a backup service for maintaining a backup of objects on a disk or in a directory that permits the backup of an object to be shared with another user, and more specifically pertains to providing the backup service that utilizes functionality of a bidirectional synchronization service to enable the sharing of the object with another user.

BACKGROUND

For as long as there have been digital files, there have been mechanisms to back up those files. Whether back up DVDs, USB hard drives, disc redundancy (RAID) and/or cloud backups, people have relied on mechanisms to back up their digital objects. More recently, services that provide access to digital objects in the cloud for modification by an accessing device, or synchronization services that provide access to objects on any device with a synchronization agent have become popular.

BRIEF DESCRIPTION OF THE DRAWINGS

FIG. 4 is a flowchart of a method for displaying a backed-up directory and maintaining a backup directory at the content management system in accordance with some aspects of the present technology.

FIG. 7 illustrates an example user interface showing detailed information about a selected backed-up directory in accordance with some aspects of the present technology.

FIG. 9 illustrates an example method for sharing an object that is stored in a backup service for collaboration with another user in accordance with some aspects of the present technology.

DETAILED DESCRIPTION

Figure 1A:
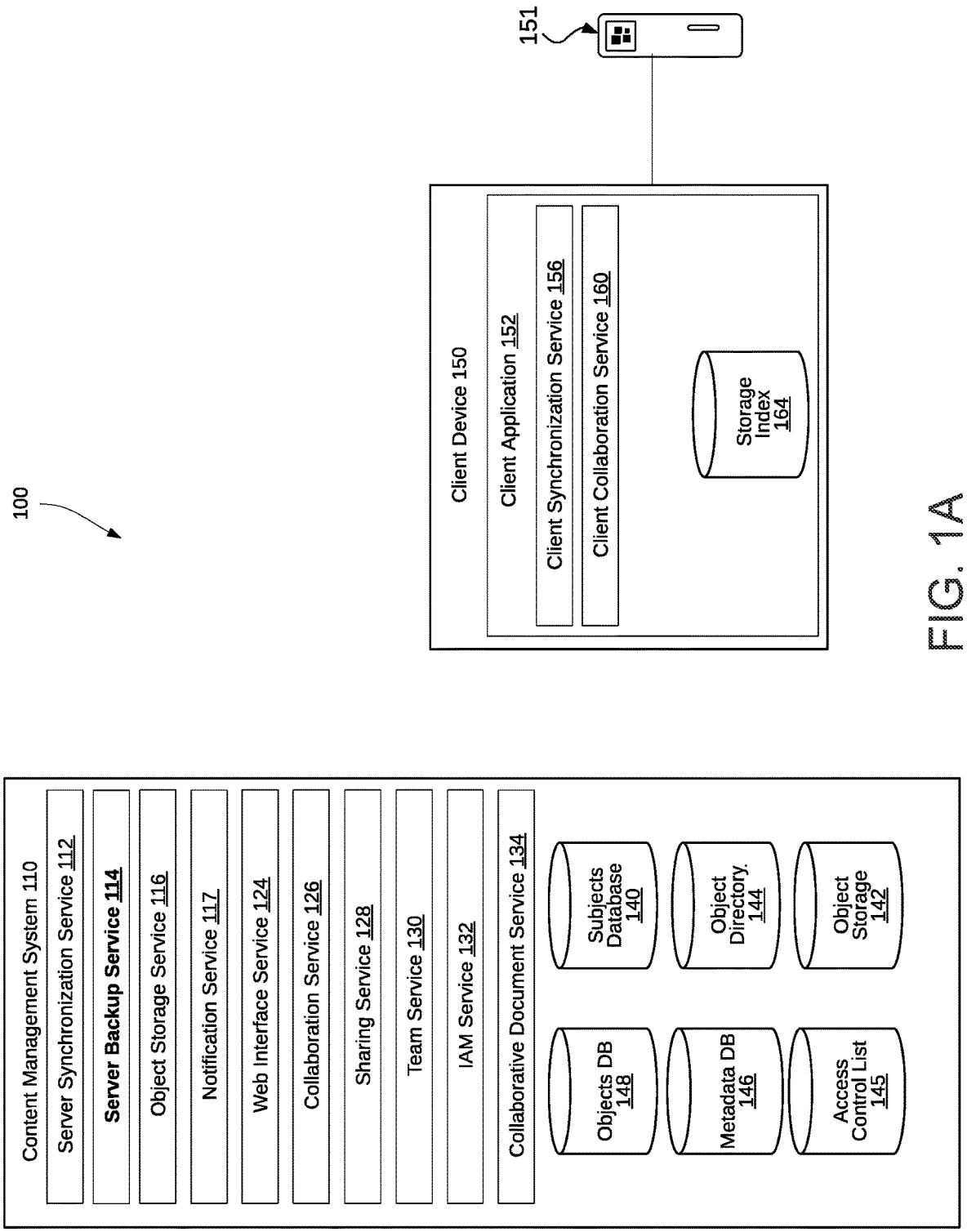
FIG. 1A and FIG. 1B illustrate examples of a content management system, object backup service, and client device in accordance with some aspects of the present technology.

As services that provide access to digital objects in the cloud for modification by an accessing device have become popular, a growing demand has appeared for true backup services. While cloud-based storage or synchronization services ostensibly perform the core function of a backup service, many users find these services to be unsatisfactory for their backup needs. At the same time, users have become comfortable with these cloud-based storage or synchronization services and want these services to provide a true backup service along with their other offerings.

Cloud-based storage or synchronization services often maintain a copy of all of a user's digital objects (or at least objects to which the user has given the service access), and thus provide a backup copy of those objects. Many such services also provide features that allow a user to find a copy of an object that existed at a past date, which makes it so objects that have been modified over time can have iterative versions backed-up. However, some cloud-based storage or synchronization services allow objects to be shared and modified by multiple different users. Such services also allow the digital objects to be modified from many different devices. However, this ease of access and modification is contrary to the concept of a backup service where users expect copies of objects to be more static. At a minimum, users expect the location to be backed up to be a source of truth for the versions of the objects and therefore any service that allows objects to be modified from other sources is inconsistent with a backup service.

The infrastructure of current cloud-based storage or synchronization services is highly developed and optimized for copying objects from one location to another. Accordingly, it is desirable to use the trusted infrastructure of cloud-based storage or synchronization services to provide a backup service, but some modifications need to be made to allow the backup service to function as users desire. Accordingly, the present technology is directed to modifying the existing infrastructure of cloud-based storage or synchronization services to provide a backup service.

Additionally, service providers providing cloud-based storage or synchronization services are well equipped to provide a backup service that meets users' needs, but certain problems need to be solved. For example, the synchronization service and backup service need to have different behaviors germane to the respective type of services. Additionally, when the same service provider would be providing both types of services, there are challenges related to providing separate user interfaces for each service without confusing a user. For example, a user will expect to be able to make changes to objects in the synchronization service, but not objects in the backup service. The user interface will need to provide separation between the types of services. The present technology is directed to solving such problems.

The present technology is directed to providing a backup service that utilizes functionality of a bidirectional synchronization service to enable the sharing an object backed up by the backup service with another user. The purpose of a backup service is to ensure that the backup service maintains a reliable copy of the directory that is backed up, so providing functionality for sharing and other types of collaboration is inconsistent with the purpose of the backup service since objects that are shared often get modified. Nevertheless, users sometimes desire to share a copy of an object that is backed up by the backup service. The present technology can make this sharing of a copy of the object that is backed up by the backup service easier and more efficient.

The present technology provides an interface between a backup service and a synchronization service whereby an object that is backed up by the backup service can be easily copied to a location in the synchronization service. From within the synchronization service, a variety of collaboration options for use with the copy of the object can be supported.

In some embodiments, the backup service can provide a menu of collaboration options that can be selected within the backup service for implementation by the synchronization service. In such an embodiment, when a user selects a collaboration option from the menu of collaboration options in the backup service, the backup service can call the synchronization service to copy the backup object into the synchronization service and implement the selected collaboration option. Such embodiments can provide a benefit of reducing the number of user interfaces that need to be displayed and interacted with in order to carry out the intent of the user to offer a copy of the backup object for collaboration.

The present technology also provides improved user interfaces. The backup objects and the synchronization objects are kept separate at every user interface. For example, regardless of whether a file system is being browsed by a native file system browser germane to a client device or being viewed through a user interface provided by the content management system (e.g., via a web browser), the backed-up directory is clearly distinct from the synchronized directory. Although both directories might be associated with the same user account at the content management system, a user will see an interface that matches their expectations for the service that applies to a particular directory. When collaboration options are presented within the backup service, the user interface will unambiguously inform the user that the backup object will not be changed and/or that the collaboration options are provided by the synchronization service.

These are just some of the benefits provided by the present technology and should not be considered a complete list of all benefits.

In some embodiments, the disclosed technology is deployed in the context of a content management system having object synchronization capabilities, object backup capabilities, and collaboration features, among others. An example system configuration 100 is shown in 1A, which depicts content management system 110 interacting with a client device 150. In some embodiments, the disclosed technology is deployed in the context of a content management system having object synchronization capabilities and collaboration features that can interface with a separate object backup system, for example, a third-party object backup system. An example system configuration 102 is shown in FIG. 1B, which depicts content management system 110 interacting with a server backup service 114, and a client device 150.

Accounts

Content management system 110 can store objects in association with accounts, as well as perform a variety of object management tasks, such as retrieve, modify, browse, and/or share the object(s). Furthermore, content management system 110 can enable an account to access object(s) from multiple client devices.

Content management system 110 supports a plurality of accounts. A subject (user, group, team, company, etc.) can create an account with content management system 110, and account details can be stored in subject database 140. Subject database 140 can identify a registered subject by a subject ID, and store profile information for registered subjects in association with the subject ID. In some cases, profile information for registered subjects includes a subject name and/or email address. Subject database 140 can include account management information, such as account type (e.g., various tiers of free or paid accounts), storage space allocated, storage space used, client devices 150 having a registered content management client application 152 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subject database 140 need not store complete information associated with an account for a subject. Some portion of information associated with an account for a subject can also be stored in another database of content management system 110 such as metadata database 146, or in a database external to content management system 110.

Subject database 140 can store groups of accounts associated with a subject. Groups can have permissions based on group permissions statements and/or access control lists, and members of the groups can inherit the permissions. For example, a marketing group can have access to one set of objects while an engineering group can have access to another set of objects. An administrator group can modify groups, modify subject accounts, etc. Groups are also subjects identified by subject ID.

In some embodiments, subject database 140 can be broken into a plurality of tables, indexes and other data structures.

Object Storage

A feature of the content management system 110 is the storage of objects, which can be stored in object storage 142. An object generally is any entity that can be recorded in a file system. Objects can be any object including digital data such as documents, collaboration objects, text files, audio files, image files, video files, webpages, executable files, binary files, directories, folders, zip files, playlists, albums, etc.

In some embodiments, objects can be grouped into a collection, which can refer to a folder including a plurality of objects, or a plurality of objects that are related or grouped by a common attribute.

In some embodiments, object storage 142 is combined with other types of storage or databases to handle specific functions. Object storage 142 can store objects, while metadata regarding the objects can be stored in metadata database 146. Likewise, data regarding where an object is stored in object storage 142 can be stored in content directory 144. Additionally, data regarding changes, access, etc. can be stored in object database 148. Object database 148 can also include a subject account identifier that identifies the subject IDs that have access to the object.

In some embodiments, object database 148 can be broken into a plurality of tables, indexes and other data structures.

Each of the various storages/databases such as object storage 142, content directory 144, object database 148, and metadata database 146 can be comprised of more than one such storage or database and can be distributed over many devices and locations. Other configurations are also possible. For example, data from object storage 142, content directory 144, object database 148, and/or metadata database 146 may be combined into one or more object storages or databases or further segmented into additional object storages or databases. Thus, content management system 110 may include more or less storages and/or databases than shown in FIG. 1A and FIG. 1B.

In some embodiments, object storage 142 is associated with at least one object storage service 116, which includes software or other processor executable instructions for managing the storage of objects including, but not limited to, receiving objects for storage, preparing objects for storage, selecting a storage location for the object, retrieving objects from storage, etc. In some embodiments, object storage service 116 can divide an object into smaller chunks for storage at object storage 142. The location of each chunk making up an object can be recorded in content directory 144. Content directory 144 can include a content entry for each object stored in object storage 142. The content entry can be associated with an object ID, which identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object, but will output a different hash for a different object. Using this methodology, object storage service 116 can output a unique hash for each different version of an object.

Object storage service 116 can also designate or record a content path for an object in object database 148. The content path can include the name of the object and/or folder hierarchy associated with the object. For example, the content path can include a folder or path of folders in which the object is stored in a local file system on a client device. In some embodiments, object database might only store a direct ancestor or direct child of any object, which allows a full path for an object to be derived.

While objects are stored in object storage 142 in blocks and may not be stored under a tree like directory structure, such directory structure is a comfortable navigation structure for subjects. Object storage service 116 can define or record a content path for an object wherein the "root" node of a directory structure can be any directory with specific access privileges assigned to it, as opposed to a directory that inherits access privileges from another directory.

In some embodiments, a root directory can be mounted underneath another root directory to give the appearance of a single directory structure. This can occur when an account has access to a plurality of root directories. However, such as in the case when content management system 110 provides a backup service and a synchronization service, a root directory for the backup service might not be mounted within a root directory of a synchronization service since permissions and behavior of the two directories are different and not compatible. As addressed above, the directory structure is merely a comfortable navigation structure for subjects, but does not correlate to storage locations of objects in object storage 142.

While the directory structure in which an account views objects does not correlate to storage locations at content management system 110, the directory structure can correlate to storage locations on client device 150 depending on the file system used by client device 150.

As addressed above, a content entry in content directory 144 can also include the location of each chunk making up an object. More specifically, the content entry can include content pointers that identify the location in object storage 142 of the chunks that make up the object.

Object storage service 116 can decrease the amount of storage space required by identifying duplicate objects or duplicate blocks that make up an object or versions of an object. Instead of storing multiple copies, object storage 142 can store a single copy of the object or block of the object and content directory 144 can include a pointer or other mechanism to link the duplicates to the single copy.

Object storage service 116 can also store metadata describing objects, object types, folders, file paths, and/or the relationship of objects to various accounts, collections, or groups in metadata database 146, in association with the object ID of the object.

Object storage service 116 can also store a log of data regarding changes, access, etc. in object database 148. Object database 148 can include the object ID of the object and can optionally include a description of the change or access action along with a time stamp or version number and any other relevant data. Object database 148 can also include pointers to blocks affected by the change or object access. Object storage service can provide the ability to undo operations, by using an object version control that tracks changes to objects, different versions of objects (including diverging version trees), and a change history that can be acquired from object database 148.

Object Synchronization

Another feature of content management system 110 is the synchronization of objects with at least one client device 150. Client device(s) can take different forms and have different capabilities. For example, client device 150 can be a computing device having a local file system accessible by multiple applications resident thereon. Client device 150 can be a computing device wherein objects are only accessible to a specific application or by permission given by the specific application, and the objects are typically stored either in an application specific space or in the cloud. Client device 2150 can be any client device accessing content management system 110 via a web browser and accessing objects via a web interface. Client devices 2150 can be in form factors such as a laptop, mobile device, or web browser, it should be understood that the descriptions thereof are not limited to devices of these example form factors. For example, a mobile device might have a local file system accessible by multiple applications resident thereon. As such, the form factor should not be considered limiting when considering client 150's capabilities. One or more functions described herein with respect to client device 150 may or may not be available on every client device depending on the specific capabilities of the device—the file access model being one such capability.

In some embodiments, client device 150 can be communicatively connected to an external hard drive 151.

In many embodiments, client devices are associated with an account of content management system 110, but in some embodiments, client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to objects between client device 150 and content management system 110.

Client device 150 can synchronize content with content management system 110 via client synchronization service 156. The synchronization can be platform agnostic. That is, content can be synchronized across multiple client devices of varying types, capabilities, operating systems, etc. Client synchronization service 156 can synchronize any changes (new, deleted, modified, copied, or moved objects) to objects in a designated directory of a file system of client device 150 that is monitored by synchronization service 156.

In some embodiments, client synchronization service 156 is a bi-directional synchronization service whereby objects can be synchronized from client device 150 to content management system 110, and vice versa. In embodiments wherein synchronization is from client device 150 to content management system 110, a subject can manipulate objects directly from the file system of client device 150, while client synchronization service 156 can monitor a designated directory on client device 150 for changes to files within the monitored folders.

When client synchronization service 156 detects a write, move, copy, or delete of content in a directory that it monitors, client synchronization service 156 can synchronize the changes to object storage service 116. In some embodiments, client synchronization service 156 can perform some functions of object storage service 116 including functions addressed above such as dividing the object into blocks, hashing the object to generate a unique identifier, etc. Client synchronization service 156 can index content within client storage index 164 and save the result in storage index 164. Indexing can include storing paths plus the object identifier, and a unique client identifier for each object. In some embodiments, client synchronization service 156 learns the object identifier from server synchronization service 112, and learns the unique client identifier from the operating system of client device 150.

Client synchronization service 156 can use storage index 164 to facilitate the synchronization of at least a portion of the objects within client storage with objects associated with a subject account on content management system 110. For example, client synchronization service 156 can compare storage index 164 with content management system 110 and detect differences between content on client storage and content associated with a subject account on content management system 110. Client synchronization service 156 can then attempt to reconcile differences by uploading, downloading, modifying, and deleting content on client storage as appropriate. Object storage service 116 can store the changed or new block for the object and update object database 148, metadata database 146, content directory 144, object storage 142, subject database 140, etc. as appropriate.

When synchronizing from content management system 110 to client device 150, data regarding a mount, modification, addition, deletion, move of an object recorded in object database 148 can trigger a notification to be sent to client device 150 using notification service 117. When client device 150 is informed of the change, client device 150 can make a request for changes listed in object database 148 since the last synchronization point known to the client device. When client device 150 determines that it is out of synchronization with content management system 110, client synchronization service 156 requests object blocks including the changes, and updates its local copy of the changed objects.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for object changes and queue those changes for later synchronization to content management system 110 when a network connection is available. Similarly, a subject can manually start, stop, pause, or resume synchronization with content management system 110.

Client synchronization service 156 can synchronize all content associated with a particular subject account on content management system 110. Alternatively, client synchronization service 156 can selectively synchronize some of the objects associated with the particular subject account on content management system 110. Selectively synchronizing only some of the objects can preserve space on client device 150 and save bandwidth.

In some embodiments, client synchronization service 156 selectively stores a portion of the objects associated with the particular subject account and stores placeholder objects in client storage for the remaining portion of the objects. For example, client synchronization service 156 can store a placeholder object that has the same filename, path, extension, metadata, of its respective complete object on content management system 110, but lacking the data of the complete object. The placeholder object can be a few bytes or less in size while the respective complete object might be significantly larger. After client device 150 attempts to access the object, client synchronization service 156 can retrieve the data of the object from content management system 110 and provide the complete object to client device 150. This approach can provide significant space and bandwidth savings while still providing full access to a subject's objects on content management system 110.

In some embodiments, client synchronization service 156 can be utilized to provide a backup service by monitoring a directory selected for backup and providing unidirectional synchronization from the client device to the content management system. In such embodiments, directories indicated for backup can be represented by an anchor object that includes attributes that restrict it to uni-directional synchronization.

In some embodiments, multiple instances of client synchronization service 156 can execute simultaneously. Each instance of client synchronization service 156 can be used to monitor a different directory.

Collaboration Features

Another feature of content management system 110 is to facilitate collaboration between subjects. Collaboration features include object sharing, commenting on objects, co-working on objects, instant messaging, providing presence, and seen state information regarding objects, etc.

Sharing

Content management system 110 can manage sharing objects via sharing service 128. Sharing an object by providing a link to the object can include making the object accessible from any computing device in network communication with content management system 110. However, in some embodiments a link can be associated with access restrictions enforced by content management system 110 and Identity and Access Management (IAM) service 132. Sharing content can also include linking content using sharing service 128 to share content within content management system 110 with at least one additional subject account (in addition to the original subject account associated with the object) so that each subject account has access to the object. The additional subject account can gain access to the content by accepting the content, which will then be accessible through either web interface service 124 or directly from within the directory structure associated with their account on client device 150. The sharing can be performed in a platform-agnostic manner. That is, the content can be shared across multiple client devices 150 of varying types, capabilities, operating systems, etc. The content can also be shared across varying types of subject accounts.

To share an object within content management system 110 sharing service 128 can add a subject ID of a team or of one or more subject accounts with a content item in objects database 148 associated with the object, thus granting the added subject account(s) access to the object. Sharing service 128 can also remove subject IDs from being permitted to access a content item in objects database 148 to restrict a subject account's access to the object. Sharing service 128 can record object identifiers, subject identifiers given access to an object, and access levels in objects database 148. For example, in some embodiments, subject identifiers associated with a single content item can specify different permissions for respective subject identifiers with respect to the associated object.

In some embodiments, content management system 110 can include an access control list 145 which includes a description of complete access rights pertaining to a respective object. An access control list for any respective object in content management system can be derived from objects database 148. In some embodiments, it is not desirable to maintain a persistent access control list 145 for a respective object, as an access control list 145 for a respective object can be derived when needed.

To share objects outside of content management system 110, sharing service 128 can generate a custom network address, such as a uniform resource locator (URL), which allows any web browser to access the object or collection in content management system 110 without any authentication.

To accomplish this, sharing service 128 can include content identification data in the generated URL, which can later be used to properly identify and return the requested object. For example, sharing service 128 can include the account identifier and the content path or an object identifying code in the generated URL. Upon selection of the URL, the content identification data included in the URL can be transmitted to content management system 110, which can use the received content identification data to identify the appropriate object and return the object.

In addition to generating the URL, sharing service 128 can also be configured to record in objects database 148 that a URL to the object has been created. In some embodiments, an entry into objects database 148 associated with an object can include a URL flag indicating whether a URL to the object has been created. For example, the URL flag can be a Boolean value initially set to 0 or false to indicate that a URL to the object has not been created. Sharing service 128 can change the value of the flag to 1 or true after generating a URL to the object.

In some embodiments, sharing service 128 can associate a set of permissions to a URL for an object. For example, if a subject attempts to access the object via the URL, sharing service 128 can provide a limited set of permissions for the object. Examples of limited permissions include restrictions that the subject cannot download the object, save the object, copy the object, modify the object, etc. In some embodiments, limited permissions include restrictions that only permit an object to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each entry into objects database 148 can also include a URL active flag indicating whether the content should be returned in response to a request from the generated URL. For example, sharing service 128 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 128 can reactivate the URL by again changing the value of the URL active flag to 1 or true. A subject can thus easily restore access to the object without the need to generate a new URL.

In some embodiments, content management system 110 can designate a URL for uploading an object. For example, a first subject with a subject account can request such a URL, provide the URL to a contributing subject and the contributing subject can upload an object to the first subject's subject account using the URL.

Team Service

In some embodiments content management system 110 includes team service 130. Team service 130 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Teams service 130 can provide a common shared space for the team, private subject account folders, and access limited shared folders. Teams service can also provide a management interface for an administrator to manage collections and objects within team, and can manage subject accounts that are associated with the team. Teams, sub-teams, subject accounts are all given a subject identifier in subjects database 140, and the membership to teams by subject accounts is also recorded in subjects database 140.

IAM (Identity and Access Management) Service

In some embodiments, content management system 110 includes IAM service 132. IAM service 132 ensures that a subject account attempting to access an object has appropriate rights to access the object. IAM service 132 can receive a token from client application 152 that follows a request to access a namespace and can return the capabilities permitted to the subject account. For subject accounts with multiple levels of access (e.g., a subject account with subject rights and administrator rights) IAM service 132 can also require explicit privilege escalation to avoid unintentional actions by administrators.

Presence and Seen State

In some embodiments, content management system can provide information about how subjects with which an object is shared are interacting or have interacted with the object. In some embodiments, content management system 110 can report that a subject with which an object is shared is currently viewing the object. For example, client collaboration service 160 can notify notifications service 117 when client device 150 is accessing the object. Notifications service 117 can then notify all client devices of other subjects having access to the same object of the presence of the subject of client device 150 with respect to the object.

In some embodiments, content management system 110 can report a history of subject interaction with a shared object. Collaboration service 126 can query data sources such as metadata database 146 and object database 148 to determine that a subject has saved the object, that a subject has yet to view the object, etc., and disseminate this status information using notification service 117 to other subjects so that they can know who currently is or has viewed or modified the object.

Collaboration service 126 can facilitate comments associated with content, even if an object does not natively support commenting functionality. Such comments can be stored in metadata database 146.

Collaboration service 126 can originate and transmit notifications for subjects. For example, a subject can mention another subject in a comment and collaboration service 126 can send a notification to that subject that he has been mentioned in the comment. Various other object events can trigger notifications, including deleting an object, sharing an object, etc.

Collaboration service 126 can provide a messaging platform whereby subjects can send and receive instant messages, voice calls, emails, etc.

Collaboration Objects

In some embodiments, content management service can also include Collaborative document service 134 which can provide an interactive object collaboration platform whereby subjects can simultaneously create collaboration objects, comment in the collaboration objects, and manage tasks within the collaboration objects. Collaboration objects can be files that subjects can create and edit using a collaboration object editor, and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments this can be managed by requiring two subjects to access an object through a web interface and there they can work on the same copy of the object at the same time.

Collaboration Companion Interface

In some embodiments, client collaboration service 160 can provide a native application companion interface for the purpose of displaying information relevant to an object being presented on client device 150. In embodiments wherein an object is accessed by a native application stored and executed on client device 150, where the object is in a designated location of the file system of client device 150 such that the object is managed by content application 152, the native application may not provide any native way to display the above-addressed collaboration data. In such embodiments, client collaboration service 160 can detect that a subject has opened an object, and can provide an overlay with additional information for the object, such as collaboration data. For example, the additional information can include comments for the object, status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage 142 via an API on behalf of a subject. For example, a software package such as an application running on client device 150, can programmatically make API calls directly to content management system 110 when a subject provides authentication credentials, to read, write, create, delete, share, or otherwise manipulate content.

A subject can view or manipulate content stored in a subject account via a web interface generated and served by web interface service 124. For example, the subject can navigate in a web browser to a web address provided by content management system 110. Changes or updates to content in the object storage 142 made through the web interface, such as uploading a new version of an object, can be propagated back to other client devices associated with the subject's account. For example, multiple client devices, each with their own client software, can be associated with a single account, and objects in the account can be synchronized between each of the multiple client devices.

Client device 150 can connect to content management system 110 on behalf of a subject. A subject can directly interact with client device 150, for example when client device 150 is a desktop or laptop computer, phone, television, internet-of-things device, etc. Alternatively or additionally, client device 150 can act on behalf of the subject without the subject having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the subject can also interact with content management system 110 via a third-party application, such as a web browser, that resides on client device 150 and is configured to communicate with content management system 110. In various implementations, the client-side application 152 can present a subject interface (UI) for a subject to interact with content management system 110. For example, the subject can interact with the content management system 110 via a file system explorer integrated with the file system or via a webpage displayed using a web browser application.

In some embodiments, client application 152 can be configured to manage and synchronize content for more than one account of content management system 110. In such embodiments, client application 152 can remain logged into multiple accounts and provide normal services for the multiple accounts. In some embodiments, each account can appear as folder in a file system, and all objects within that folder can be synchronized with content management system 110. In some embodiments, client application 152 can include a selector to choose one of the multiple accounts to be the primary account or default account.

Third Party Services

In some embodiments content management system 110 can include functionality to interface with one or more third-party services such as workspace services, email services, task services, backup services, etc. In such embodiments, content management system 110 can be provided with login credentials for a subject account at the third party service to interact with the third party service to bring functionality or data from those third party services into various subject interfaces provided by content management system 110.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 1B:
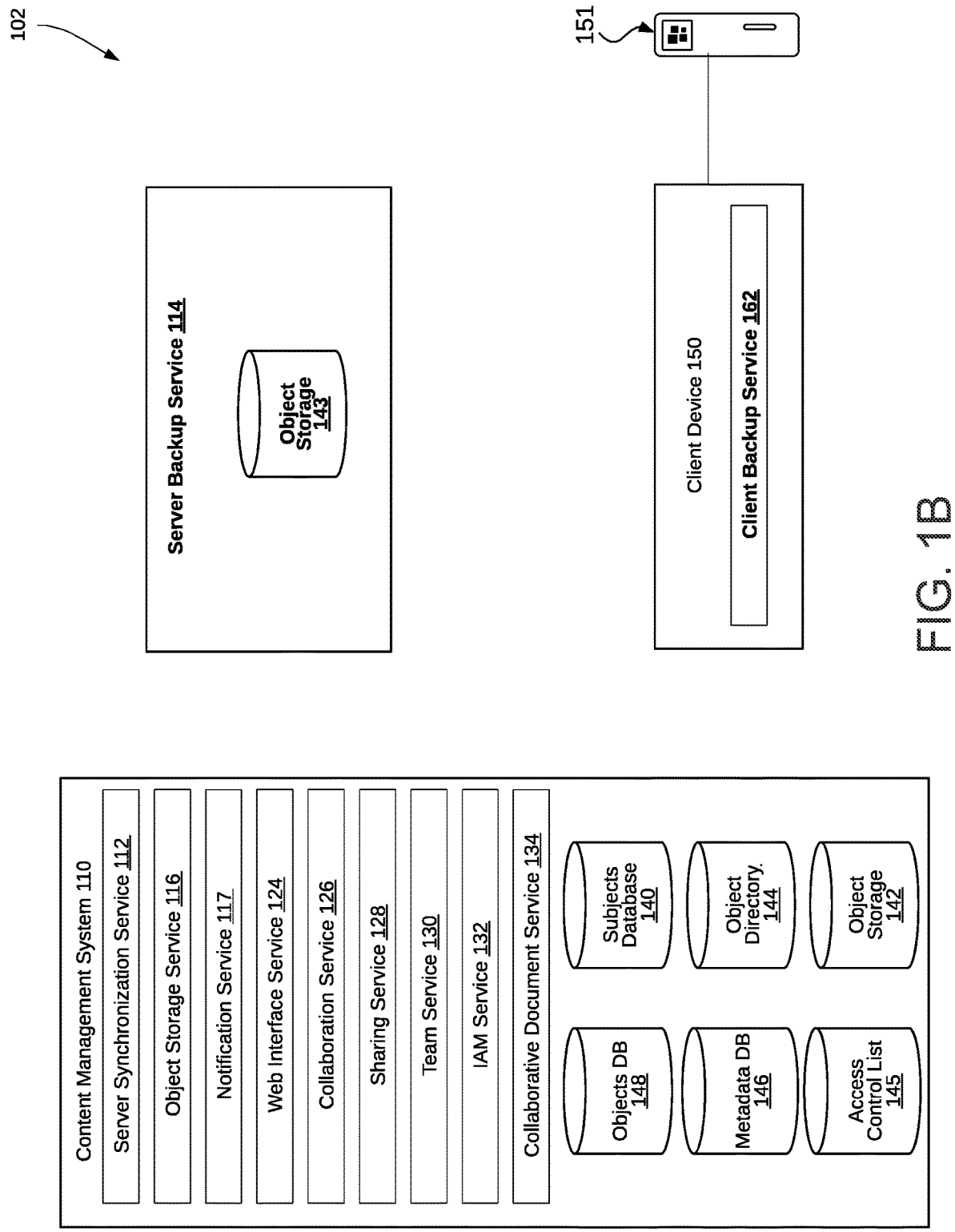

FIG. 1A also illustrates server backup service 114 as part of the content management system 110. The server backup service 114 can provide a user experience and service dedicated to backing up objects. For example, the server backup service 114 can provide a service to uni-directionally synchronize objects stored at a directory on the client device 150 or external hard drive 151 to the content management system. The backup service 114 can provide separate user interfaces to distinguish the features and functionality of a backup service as distinction from directories subject to bi-directional synchronization. In some embodiments, although the server synchronization service 112 is differentiated from the server backup service 114, both services can utilize the same bi-directional client synchronization service 156 on the client device 150 to synchronize objects from the client device 150 to the content management system 110.

Anchor Object

In some embodiments, such as illustrated in system configuration 100 in FIG. 1A, the content management system 110 can include functionality to generate an anchor object for an external directory that is external to a monitored directory on the client device 150. An anchor object is an object with special attributes. The client application 152 can recognize the anchor object as an object pointing to a directory that is external to a directory that is monitored by bi-directional client synchronization service 156. For example, an anchor object can be located in a directory monitored by client synchronization service 156, where the anchor object points to an external directory—external hard drive 151 or other directories on client device 150 that are outside of the directory monitored by the bi-directional synchronization service 156.

By utilizing the anchor object, the content of the external directory represented by the anchor object can be synchronized to the content management system 110. In some embodiments, the anchor object can be associated with properties that instruct the client synchronization service to synchronize the objects in the external directory directly without being first stored on the client device 150.

From the perspective of the content management system 110, the external directory represented by the anchor object can be treated as if the external directory were located within the directory that contains the anchor object. The anchor object can be stored as a directory in the monitored directory and can appear with objects located underneath it.

However, from the perspective of the client synchronization service 156, the anchor object has special attributes that change some characteristics about how it is synchronized and can change some aspects of the synchronization of objects stored in the external directory. The anchor object is a file or special object with a flag as part of the special attributes to indicate that it is an anchor object. Likewise, any objects under the anchor object might have flags or special attributes to indicate that they are part of an external directory.

In some embodiments, the special attributes of the anchor object are extended attributes or ultimate data streams that describe attributes of an associated external directory. For example, the special attribute can be a Xattr that stores the location information of the associated external directory as a Binary Large Object (BLOB). The location information includes, but is not limited to a directory ID, an iNode reference, a device ID, an object ID, a unique ID (UUID), a target location, a path, etc. The special attributes can serve as a source of truth for the identification and location of the external directory and its corresponding contents.

In some embodiments, the client synchronization service 156 can recognize an anchor object by detecting the presence of its special attributes. After determining the object is a valid anchor object, the client synchronization service 156 can read the contents of the associated external directory indicated by the special attributes. Then, the client synchronization service 156 can communicate with the server synchronization service 112 to synchronize objects stored on the external directory to the content management system 110. Such synchronization of the external directory can occur periodically or when certain file events occur.

In some embodiments, the client synchronization service 156 can recognize the anchor object as being restricted to uni-directional synchronization. In such embodiments, the special attributes can identify an original source of the objects such that changes can be synchronized from the original source to the content management system, but client synchronization service 156 cannot write changes from the content management system 110 to the original source.

FIG. 1B illustrates an alternate example system configuration 102, which depicts content management system 110 interacting with a server backup service 114, and a client device 150. In system configuration 102, the server backup service 114 is a stand-alone service, or at least is not part of the content management system 110. In some embodiments, the server backup service 114 is a third-party service with respect to the content management system, but the server backup service 114 can communicate with the content management system 110 over a network and/or through one or more application programming interfaces (APIs).

While server backup service 114 is illustrated without the many features of the content management system 110, it will be appreciated by those of ordinary skill in the art that the server backup service 114 can include any service described with respect to content management system 110 except those that are inconsistent with a backup service. For example, services that are inconsistent with a backup service might be any services utilized for sharing or editing objects, e.g., collaboration service 126, sharing service 128, team service 130, and collaborative document service 134, etc.

The server backup service 114 can include its own object storage 143 which can be similar to the object storage 142 of the content management system 110.

System configuration 102 of FIG. 1B also illustrates client device 150 including a client backup service 162. The client backup service 162 can operate as a uni-directional synchronization engine configured to copy changes from a source directory to be backed up to the server backup service 114. The disclosure below primarily addresses embodiments wherein the bidirectional client synchronization service 156 is utilized. All of these embodiments are equally applicable to the client backup service 114. For example, the client backup service 162 might have bi-directional functionality, but might limit synchronization to be uni-directional when performing most backup functions.

As used herein, the term object backup service is sometimes interchangeable with the term server backup service. The term object backup service is a broader term that refers to the combination of the server backup service and the client backup service. The use of the terms object backup service or server backup service does not distinguish whether the object backup service is that of the architecture shown in FIG. 1A or FIG. 1B.

As used herein, the term synchronization service can refer to the combination of the server synchronization service and the client synchronization service. In some embodiments, although the server synchronization service 112 is differentiated from the server backup service 114 in FIG. 1A, both services can utilize the same bi-directional client synchronization service 156 on the client device 150 to synchronize objects from the client device 150 to the content management system 110. As used herein, the term server synchronization service or synchronization service refers to the services of the content management system other than the backup service functions. Therefore, the use of the term synchronization service is meant to differentiate from the backup service.

Figure 2:
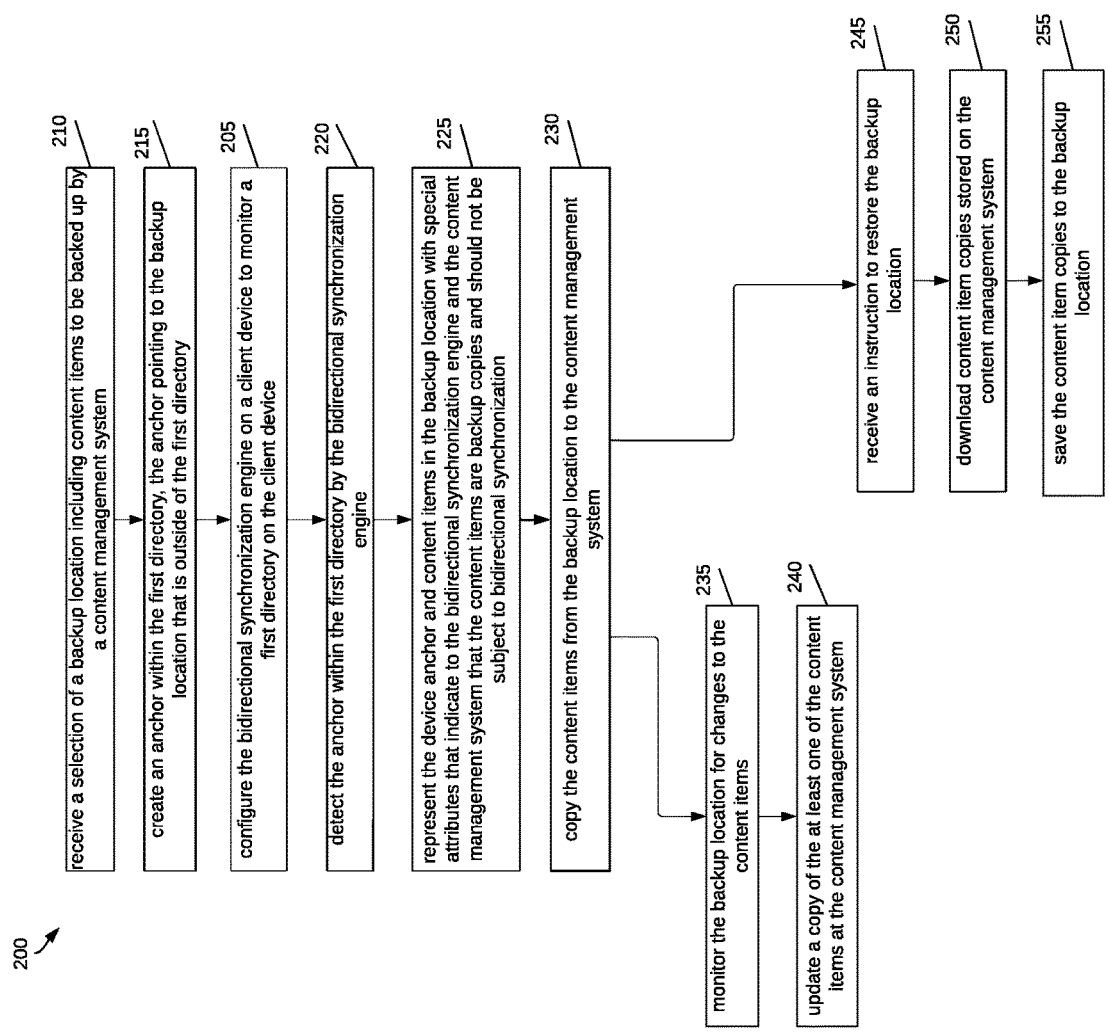
FIG. 2 is a flowchart of a method for using a bi-directional synchronization service of a content management system to provide an object backup service in accordance with some aspects of the present technology.

FIG. 2 illustrates an example method 200 for using a bi-directional client synchronization service of a content management system to provide an object backup service. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some embodiments, the method includes receiving a selection of a backup location including objects to be backed up by a content management system at block 210. For example, the client application 152 may provide a user interface to allow a user to indicate that they would like to back up a directory or drive including objects to be backed up by a content management system. The client application 152 can receive a selection in the provided user interface.

When a user makes a selection of a backup location for the first time, in some embodiments, client application 152 can create a new directory—a first directory—to contain a reference, called an anchor, to any backup locations. According to some embodiments, the method includes creating the anchor within the first directory at block 215. The anchor points to the backup location that is outside of the first directory. For example, the client application 152 may create the anchor within the first directory. If the user selects other backup directories they can also be represented by an anchor stored within the first directory. In this way, the first directory serves as a location that includes a reference to all backup locations on or connected to client device 150.

Figure 5A:
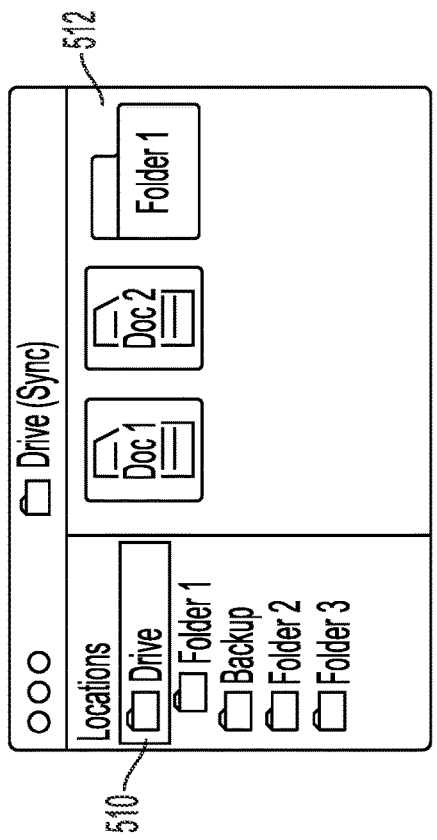
FIG. 5A and FIG. 5B are example user interfaces showing an object browsing interface with object organization within a file system of the client device, where the file system includes a synchronization directory and a backup directory in accordance with some aspects of the present technology.

One purpose for creating the first directory to include anchors for all backup locations is to separate backup locations from bi-directional synchronization locations. For example, as illustrated in FIG. 5A, an object browsing interface can distinguish the first directory (called Backups) for backups from a second directory (called Drive) containing objects subject to bidirectional synchronization. While it can be possible to represent an anchor object in a directory including objects subject to bidirectional synchronization, this can be confusing to a user and not provide a desirable user experience.

According to some embodiments, the method includes configuring the bidirectional client synchronization service on a client device to monitor a first directory on the client device at block 205. For example, the client synchronization service 156 may configure synchronization service 156 to monitor a first directory on the client device where the first directory contains objects to be backed up.

In addition to creating the first directory to contain anchor objects for locations to be backed-up and a second directory to contain objects subject to bi-directional synchronization, in some embodiments, the client device can instantiate multiple instances of the bidirectional synchronization service 156, where a first instance of the bidirectional client synchronization service is configured to watch the first directory, and a second instance of the bidirectional client synchronization service is configured to watch a second directory. As noted above, the first directory contains objects to be backed up while the second directory includes objects for bidirectional synchronization. In some embodiments, the first directory and second directory should not be subordinate to one another. In other words, the first directory should not be in a path subordinate to the second directory, and the second directory should not be a path subordinate to the first directory. While the example pertains to a first and second directory and a first and second instance of bidirectional client synchronization service, it should be appreciated that there can be any number of directory and bidirectional client synchronization service instance combinations.

When client device 150 has instantiated multiple instances of the bidirectional client synchronization service 156, the method can include limiting the first instance of the bidirectional client synchronization service to a lower amount of network bandwidth than an amount of bandwidth permitted to be utilized by the second instance of the bidirectional client synchronization service. For example, when the first instance of the bidirectional client synchronization service 156 is used to monitor a directory with objects to be backed up and the second instance of the bidirectional client synchronization service 156 is used to monitor objects that will be synchronized bidirectionally, it can be desirable to permit the second instance to utilize a greater portion of the existing bandwidth. This is because it may be assumed that items for backup are less likely to be needed immediately as the function of the backup is as an archive, whereas items that are synchronized bidirectionally are more likely to be actively used and shared. Additionally, the combination of instances can be configured to be limited to a total amount of bandwidth to ensure that the combination of instances does not monopolize all of the bandwidth for the client device 150.

According to some embodiments, the method includes detecting the anchor within the first directory by the bidirectional client synchronization service at block 220. For example, the client synchronization service 156 may detect the anchor within the first directory.

According to some embodiments, the method includes representing the device anchor and objects in the backup location with special attributes that indicate to the bidirectional client synchronization service and the content management system that the objects are backup copies and should not be subject to bidirectional client synchronization at block 225. For example, the client synchronization service 156 may represent the device anchor and objects in the backup location with special attributes that indicate to the bidirectional synchronization service that the objects are backup copies and should not be subject to bidirectional synchronization. The special attributes associated with the device anchor and the objects in the backup location can also be transmitted to and stored by the content management system 110 to indicate that the objects are backup copies and should not be subject to bidirectional synchronization.

The use of these special attributes for unidirectional synchronization is optional. A device anchor can point to a location that should be subject to bi-directional synchronization. Additionally, in some embodiments, such as when a backed-up directory needs to be restored, the instance of the client synchronization service can permit bidirectional synchronization in limited instances even when the special attribute indicating unidirectional synchronization is present.

According to some embodiments, the method includes copying the objects from the backup location to the content management system at block 230. For example, the client synchronization service 156 may copy the objects from the backup location to the content management system. In some embodiments, copying the objects from the backup location to the content management system is performed without copying the objects in the backup location to the first directory.

According to some embodiments, the method includes monitoring the backup location for changes to the objects at block 235. For example, the client synchronization service 156 may monitor the backup location for changes to the objects. While it is not anticipated that the backup location will be subject to frequent changes, it will happen that new objects are added to the backup location, or occasionally some objects might change. Accordingly, the present technology can utilize the functionality of the client synchronization service 156 to detect changes to content items to uni-directionally synchronize changes to the content management system 110.

In some embodiments, while the backup directory can benefit from uni-directional synchronization, the special attributes afforded to backup objects can be used to make sure that no backup objects are deleted, or at least, if a backup object is to be deleted, that the deletion is subject to additional layers of user confirmation. Specifically, the unidirectional synchronization must be subject to some limits because in order to preserve the backup purpose of the present technology it much not be possible to cause the backup copies on the content management system 110 to be deleted or corrupted when the original backup location is itself deleted or corrupted. This would defeat the purpose of having a backup. The backup copy would not be useful if it were subject to unlimited unidirectional synchronization such that when the source of the objects for backup were harmed, so too were the backed-up copies of the objects. Accordingly, the special attributes associated with the anchor object and the objects to which it points can be associated with rules or limitations.

Examples of such rules or limitations are a prohibition on deletions, deletions requiring confirmations, a limit or throttling on a number of object modifications that can happen during a period of time, a prohibition on modifications, modifications requiring confirmations, etc.

It should be appreciated that while such rules or limitations might be useful, they are not strictly needed to perform the backup function since the content management system can also provide a roll back feature to restore any object to a prior time. Accordingly, even if such rules or limitations were not used and an entire backup location were deleted, such backup location could still be restored from the content management system 110 by restoring the objects from a time prior to the deletion.

According to some embodiments, the method includes updating a copy of the at least one of the objects at the content management system after detecting a change to at least one of the objects in the backup location at block 240. For example, the client synchronization service 156 may update a copy of the at least one of the objects at the content management system after detecting a change to at least one of the objects in the backup location.

In addition to creating copies of objects and storing those objects in the cloud at content management system 110, occasionally a backup location needs to be restored, or a further copy of objects originating from the backup location needs to be made at another device.

In an instance where something has happened to the backup location, a feature of the present technology is to easily restore the backup location. According to some embodiments, the method includes receiving an instruction to restore the backup location at block 245. For example, content management system 110 may receive an instruction to restore the backup location.

According to some embodiments, the method includes downloading object copies stored on the content management system at block 250. For example, the client synchronization service 156 illustrated may download object copies stored on the content management system 110 and automatically save the object copies to the backup location at block 255. For example, since the client synchronization service 156 is a bi-directional synchronization service that is limited to uni-directional synchronization when performing the backup function, the client synchronization service 156 can utilized bi-directional synchronization capabilities to restore the object copies directly to their original location without the user having to manually download the object and copy the objects back to their original location.

Figure 3:
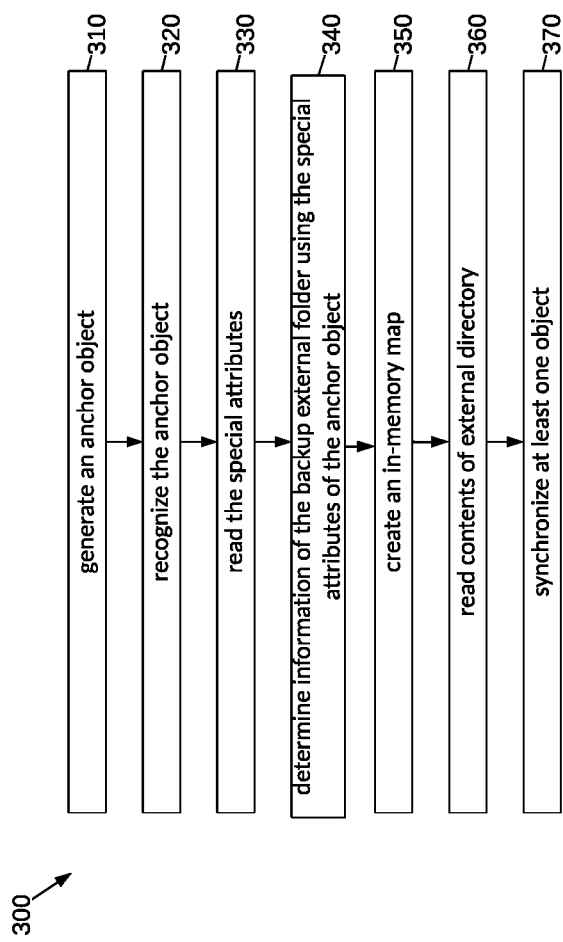
FIG. 3 is a flowchart of a method for utilizing an anchor object to provide the object backup service in accordance with some aspects of the present technology.

FIG. 3 illustrates an example method 300 for generating an anchor object. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

At operation 310, the client application 152 may generate an anchor object for an external directory. As described above with regard to FIG. 1 and FIG. 2, the anchor object is an object with special attributes, and a client application can recognize the anchor object as an object pointing to an external directory that is external to a directory that contains the anchor object. In this example, the client application treats the external directory as if the external directory were located within the directory that contains the anchor. The special attributes are extended attributes or ultimate data streams that describe attributes of the directory. The attributes of the directory include, but are not limited to a directory ID, an iNode reference, a device ID, an object ID, a UUID, a target location, a path, etc.

In some embodiments, the directory that stores the anchor is a directory that is monitored by the client synchronization service 156 and its contents are synchronized to a content management system.

At operation 320, the client synchronization service 156 may recognize the anchor object. In this example, the anchor object is recognized by the presence of the special attributes.

At operation 330, the client synchronization service 156 may read the special attributes of the anchor object. The client synchronization service 156 may read metadata pertaining to the contents of the backup directory and may process each object in the backup directory to convert the content of each object into hashed blocks.

At operation 340, a synchronization service 156 of the client application may determine information of the backup folder using the special attributes of the anchor object. For example, the client synchronization service 156 may determine the content, location information, or other information of the backup folder associated with the backup directory, using the special attributes of the anchor object.

At operation 350, the client synchronization service 156 may create an in-memory map for the backup directory based on the special attributes to convert between a device UUID of the backup directory to a content management system path in the local tree. The special attributes serve as a source of truth for the identification and location of the backup object.

At operation 360, the client synchronization service 156 may read the contents of the backup directory.

At operation 370, the client synchronization service 156 may synchronize at least one object on the backup directory to a content management system. In this example, the user can have options as to which objects should be synchronized and which objects should not be synchronized. In some embodiments, the synchronization of operation 360 is unidirectional from the backup directory to the content management system 110.

FIG. 4 illustrates an example method 400 for displaying a backed-up directory and maintaining a backup directory at the content management system. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, the method includes maintaining a user account at the content management system at block 405. For example, the content management system 110 may maintain a user account. In some embodiments, the user account is associated with a root synchronization namespace. In some embodiments, the user account is associated with a second synchronization namespace represented as a mount under the root synchronization namespace.

According to some embodiments, the method includes maintaining a backup namespace associated with the user account without mounting the backup namespace under the root synchronization namespace at block 410. For example, the content management system 110 may maintain a backup namespace associated with the user account without mounting the backup namespace under the root synchronization namespace which is used to provide bidirectional synchronization functions to the user account. In some embodiments, the specific backup location on the particular client device is indicated by an anchor object on the particular client device. At content management system 110 the anchor object is maintained as a backup namespace associated with user account, and is labeled as an anchor object type at the content management system. In some embodiments, the backup namespace is associated with an anchor object type. In some embodiments, the backup namespace represents a specific backup location on a particular client device including objects to be backed up by the content management system.

According to some embodiments, the method includes receiving a request for a graphical user interface for displaying contents of a backup namespace at block 450. For example, the content management system 110 may receive a request to provide a graphical user interface for display of contents of a backup namespace.

According to some embodiments, the method includes retrieving the backup namespace associated with the backup object type at block 455. For example, the content management system 110 may retrieve the backup namespace associated with the backup object type and the objects within the backup namespace.

According to some embodiments, the method includes presenting the graphical user interface identifying the backup namespace at block 460. For example, the content management system 110 may present the graphical user interface identifying the backup namespace and its contents.

Figure 5B:
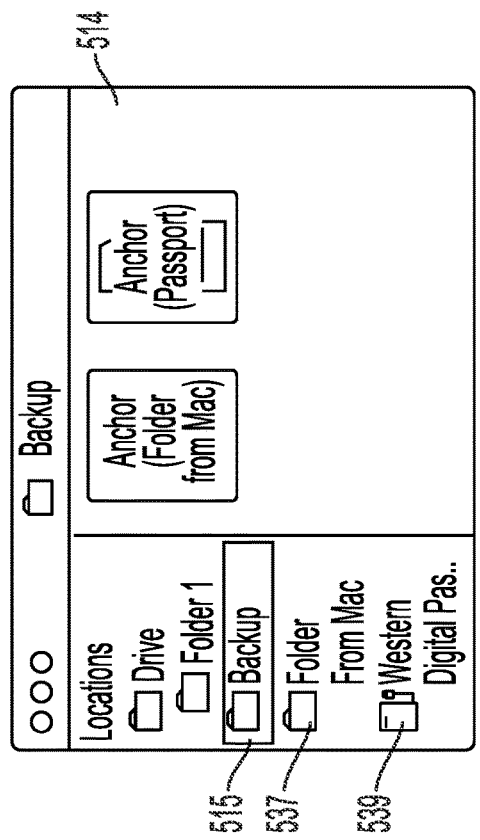

FIG. 5A and FIG. 5B illustrate example user interfaces on client device 150. As illustrated in FIG. 5A, client device 150 includes a synchronization directory 510 called "Drive." Synchronization directory 510 contains objects 512 such as document 1, document 2, and folder 1 that are synchronized with synchronization service 112 of content management system 110.

As illustrated in FIG. 5B client device 150 also includes backup directory 515. Backup directory 515 includes objects 514 which are anchor objects. One of the anchor objects points to a folder from client device 150, which in this example is a Mac computer. The other of the anchor objects points to an external hard drive, which is a Western Digital Passport hard drive.

In the locations pane on the left of FIG. 5B, Folder 1 is indicated as being located as a subdirectory of the synchronization directory 510, but the folders from the Mac computer 537 and for Western Digital Passport hard drive 539 are not illustrated as being a subdirectory of the backup directory 515. This distinction is because Folder 1 is a subdirectory of synchronization directory 510, whereas the folder from the Mac computer 537 and the Western Digital Passport hard drive 539 are not subdirectories of backup directory 515. Rather FIG. 5B illustrates anchor objects 514 within backup directory 515. The anchor objects represent and point to the backup locations (Folder from Mac and Western Digital Passport) but those backup locations are not actually located in a directory subordinate to the backup folder. As addressed above an anchor object is an object with special attributes. The client application 152 can recognize the anchor object as an object pointing to a directory that is external to a directory that is monitored by bi-directional client synchronization service 156. By utilizing the anchor object, the content of the external directory represented by the anchor object can be synchronized to the backup service 114 of content management system 110.

Figure 6:
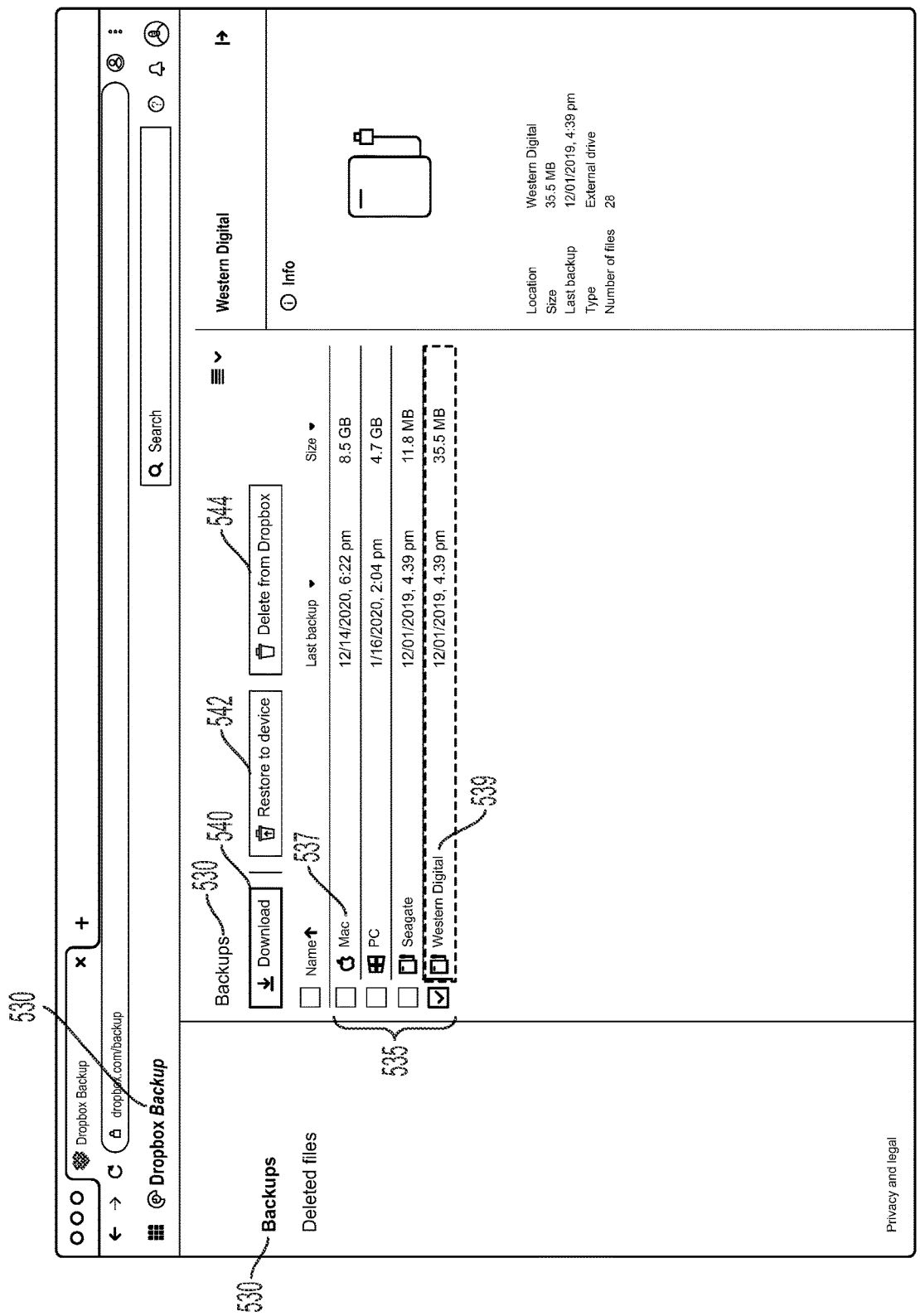
FIG. 6 illustrates an example user interface showing backed-up directories maintained by the content management system in accordance with some aspects of the present technology.

FIG. 6 illustrates a web page user interface provided by web interface service 124 of content management system 110. The web page user interface illustrates various indications that the webpage pertains to the backup service provided by content management system 110. For example, the web page user interface is labeled "Backup" 530 at several locations. The web page user interface illustrated in FIG. 6 shows all locations 535 being backed up by content management system 110, including locations associated with the client device illustrated in FIG. 5A and FIG. 5B (e.g., Folder of Mac computer 537, and Western Digital Passport hard drive 539).

The webpage user interface illustrated in FIG. 6 provides several functions to a user. One function is to download 540 the full or partial contents of any backup location. Another function is to restore 542 a back-up location. The restore 542 function allows content management system 110 to restore all objects backed up by content management system 110 to their original location at a particular client device 150. Another function is to delete 544 a backup location from being backed up by the backup service of content management system 110.

While FIG. 6 illustrates a web page user interface, it should be appreciated that the user interface could be presented by application 152 on client device 150.

FIG. 7 illustrates a user interface that can be presented by a web page or client application 152 that can show detailed information about a particular backup location. For example, the user interface illustrated in FIG. 7 presents detailed information about the backup location from the Mac computer 537. This interface provides functions such as being able to view the contents that are backed up by content management system 110, and seeing the status of uploading objects to be backed up to content management system 110. Additionally the user interface illustrated in FIG. 7 can provide functions to manage the backups such as viewing the progress of a backup, viewing the history of previously backed-up objects and changes to the objects, prioritizing an object to be backed up, removing the object from the backup, or choosing to not backup a particular object to the content management system 110. Additionally, the user interface illustrated in FIG. 7 can provide functions to recover objects. In some embodiments the full backup location can be restored, while in some embodiments it is possible to restore a particular object or a particular past version of an object.

Figure 8:
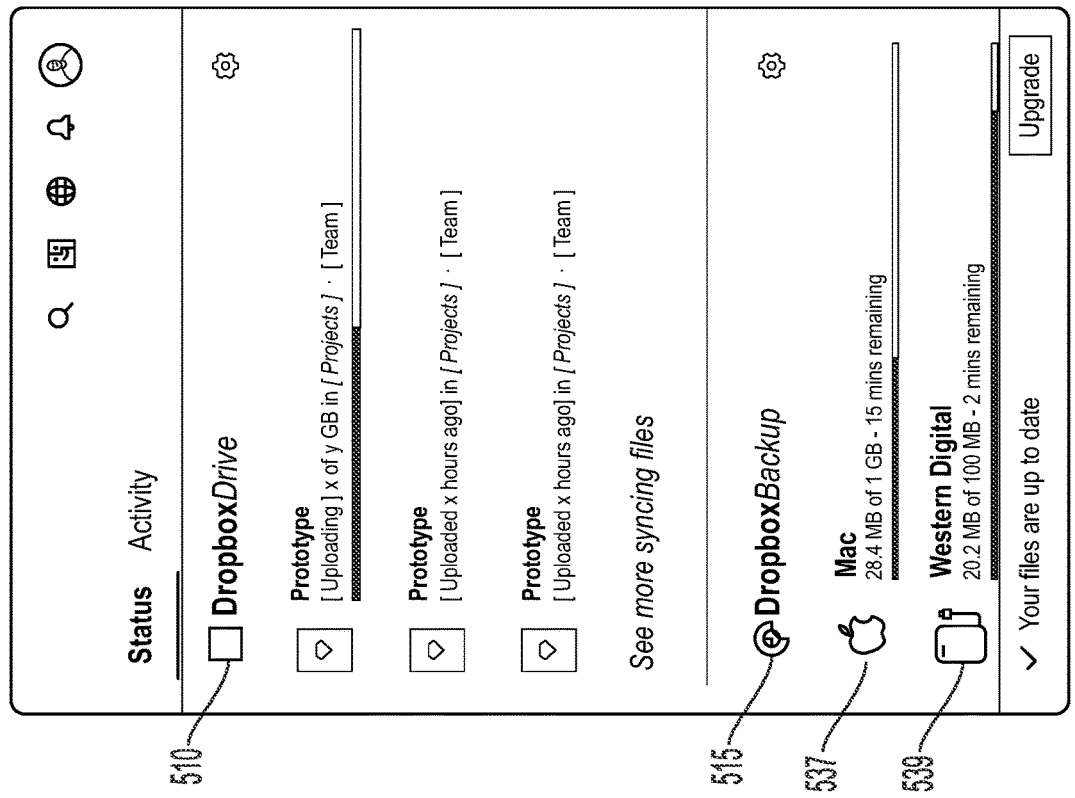
FIG. 8 illustrates an example user interface showing a status of a synchronization service and a backup service provided by the content management system in accordance with some aspects of the present technology.

FIG. 8 illustrates an example user interface from client application 152 on a mobile client device 150. User interface in FIG. 8 illustrates a differentiation between the synchronization directory 510 (called "Drive" in the figure) and the backup directory 515. Both the synchronization directory 510 and the backup directory 515 can be provided by content management system 110. The interface illustrated in FIG. 8 further provides more detailed information on the Mac computer 537 backup location and the Western Digital passport hard drive 539 backup location. While FIG. 8 illustrates an interface for a mobile application, the same or a similar interface can be presented by any computing device.

FIG. 9 illustrates an example method 900 for sharing an object that is stored by an object backup service for collaboration with another user. Although the example method 900 depicts a particular sequence of operations, the sequence may be altered without departing from the scope of the present disclosure. For example, some of the operations depicted may be performed in parallel or in a different sequence that does not materially affect the function of the method 900. In other examples, different components of an example device or system that implements the method 900 may perform functions at substantially the same time or in a specific sequence.

According to some examples, the method includes receiving a request to share a first object for collaboration at block 910. For example, the server backup service 114 illustrated in FIG. 1A and FIG. 1B may receive a request to share a first object for collaboration. As addressed herein, the object backup service ensures that objects stored within the object backup service are unmodified copies of a source of the objects for backup. That the server backup service 114 will maintain faithful copies of the source of the objects for backup is the primary quality of service parameter of the server backup service 114. The act of collaboration, however, is often associated with changes to an object, which is inconsistent with the primary function of the server backup service 114. Therefore, the present technology provides a method by which collaboration functions can be provided from a backup service through use of the server synchronization service 112 of the content management system 110.

In some embodiments, collaboration features include object sharing, commenting on objects, co-working on objects, instant messaging, requesting and receiving signatures, providing presence, and seen state information regarding objects, etc.

The request to share the first object can be to share the object with a software service. For example, the request to share the first object can be to share the object with a document signing service, a workflow service, a collaboration service, a object sharing service, a meeting service, etc. Some of these services only require a copy of the object which is then stored within the software service and is thereafter not related back to the original object, but some services result in changes to the object that the user would like to keep track of in a content management system. For example, if the object is sent for signature, the user generally would like to receive the signed copy of the object. As this would be a modified version of the object, it is not suitable to be stored back to the object's original location in the backup service 114.

In another example, the object might be sent to a collaboration service where two or more users might make comments or annotations on the object. While the object itself might not change, the user might desire to store the comments or annotations with the object, but since the comments or annotations are not in the source directory, it would be inconsistent with the operation of the backup service to store these in the object's original location in the backup service 114.

Figure 10A:
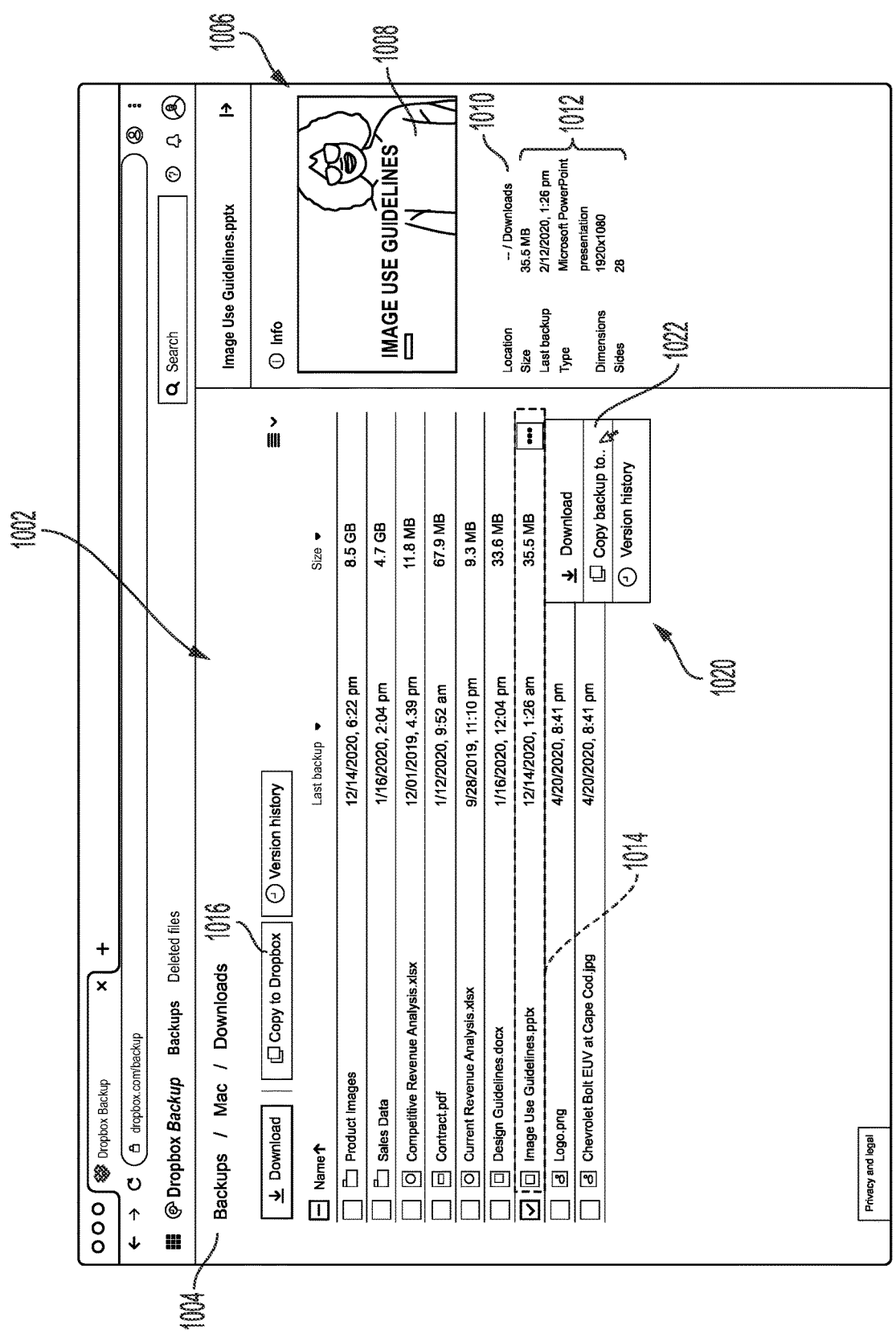
FIG. 10A and FIG. 10B illustrate example user interfaces for receiving a request to share a first object for collaboration in accordance with some aspects of the present technology.
Figure 10B:
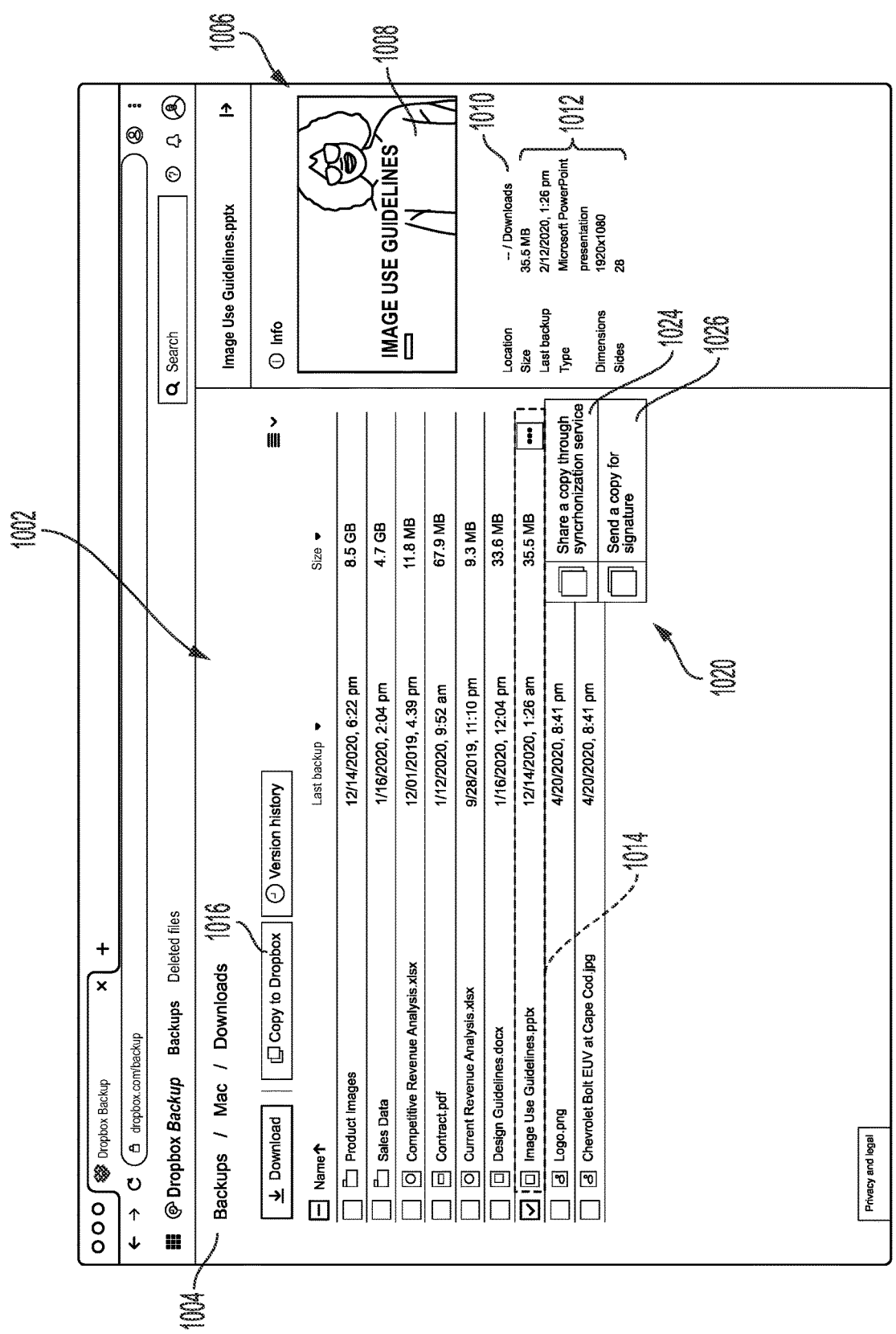

FIG. 10A and FIG. 10B illustrate example user interfaces for receiving a request to share a first object for collaboration at block 910. FIG. 10A and FIG. 10B illustrate an example user interface 1002 provided by the server backup service 114. The user interface 1002 clearly indicates that the interface pertains to a backup directory 1004, and also includes product labeling indicating that the user interface is provided by the server backup service 114. The user interface 1002 lists objects that are backed-up.

The user interface illustrated in FIG. 10A and FIG. 10B also provides a contextual panel 1006 that can provide a preview 1008 of the object, identify the source location 1010 for the object, and display other metadata pertaining to the object 1012.

The user interface illustrated in FIG. 10A and FIG. 10B also provides options to copy the backed-up object to another location where additional collaboration on the object can occur without affecting the backed-up version of the object. When an object is selected, such as object 1014, a user can also select button 1016 to choose to copy the object to the server synchronization service 112. As described herein, the server synchronization service 112 can store the object and provide several collaboration features to collaborate and modify the object. This function provides at least a minimal amount of access to collaboration features from within the server backup service 114, which as addressed herein, is inconsistent with the purpose of a backup service.

FIG. 10A also illustrates that a user can surface a contextual menu 1020 for the selected object 1014 that can also provide an option 1022 to copy the object to the server synchronization service 112.

FIG. 10B differs from FIG. 10A in that the contextual menu 1020 provides additional collaboration functionality directly from the user interface 1002 of the server backup service 114. As illustrated in FIG. 10B the contextual menu includes specific sharing options such as option 1024 to share a copy of the object through the synchronization service or option 1026 to send a copy of the object for signature. In some embodiments, it is important that the contextual menu options specifically state that a copy of the object will be created or sent to the synchronization service to be consistent with the user's understanding of the operation of the server backup service 114. Options such as those indicated in FIG. 10B can be convenient options to provide to the user because they cause the object to be copied to the server synchronization service 112, and can also communicate the user's intended type of collaboration to the synchronization service. The server backup service can inform the server synchronization service 112 of the user's intended type of collaboration to make the process of sharing the object for collaboration more efficient and more automatic.

While FIG. 10A and FIG. 10B illustrate a webpage interface showing objects backed-up by the server backup service 114 that can be copied to the server synchronization service 112 to enable collaboration on one or more of the objects, it should be appreciated that similar functionality can be provided by an object browser such as FINDER on MACOS or EXPLORER ON WINDOWS, for example through options provided in a contextual menu.

Returning to FIG. 9, according to some examples, the method includes presenting a notification informing a user that sharing the first object for collaboration will not affect the first object stored in the backup service and that a copy will be stored in an account at the object synchronization service at block 920. For example, the server backup service 114 illustrated in FIG. 1A and FIG. 1B may present a notification informing a user that sharing the first object for collaboration will not affect the first object and that a copy will be stored in an account at the object synchronization service after receiving the request to share the object for collaboration.

According to some examples, the method includes calling an API provided by an object synchronization service at block 930. For example, the server backup service 114 illustrated in FIG. 1A and FIG. 1B may call an API provided by the object synchronization service 112. The API is configured to copy the first object to a location at the object synchronization service and cause the sharing of the object for the collaboration.

According to some examples, the method includes causing the display of a user interface presenting at least one folder of a user account of the object synchronization service at block 940. For example, the server backup service 114 illustrated in FIG. 1A and FIG. 1B may cause display of a user interface presenting at least one folder of a user account of the object synchronization service. After receiving the request to share the object for collaboration, and as a result of calling the API of the object synchronization service 112, the user can be presented with a user interface allowing the user to navigate a directory structure of the object synchronization service 112 to choose a location to store the copy of the object at the object synchronization service 112.

Figure 11:
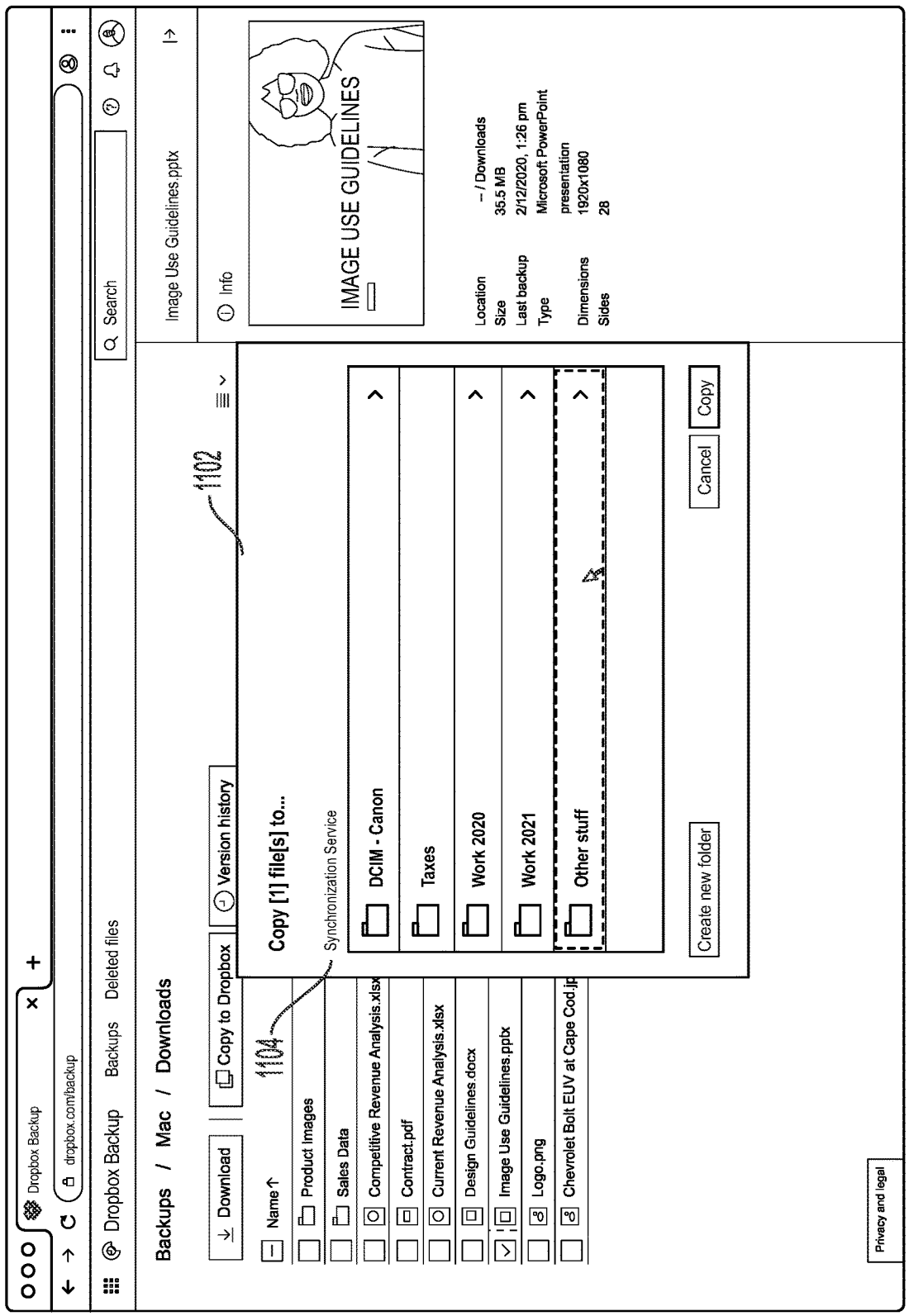
FIG. 11 illustrates an example of a user interface allowing the user to navigate a directory structure of the object synchronization service to choose a location to store the copy of the object at the object synchronization service in accordance with some aspects of the present technology.

FIG. 11 illustrates an example of the user interface 1102 allowing the user to navigate a directory structure of the object synchronization service 112 to choose a location to store the copy of the object at the object synchronization service 112. As illustrated in FIG. 11, the user has selected the "other stuff" folder. Note that the user interface 1102 indicates that the displayed directory structure is from the object synchronization service 112 by labeling 1104 the directory structure with the name of the object synchronization service 112.

According to some examples, the method includes receiving a selection of the at least one folder of the user account of the object synchronization service to which the first object is to be copied at block 950. For example, the server backup service 114 illustrated in FIG. 1A and FIG. 1B may receive a selection of the at least one folder of the user account of the object synchronization service to which to copy the first object.

According to some examples, the method includes copying the first object at block 960. For example, the server backup service 114 illustrated in FIG. 1A and FIG. 1B may copy the first object and transfer the copy of the first object to the location selected at block 950.

According to some examples, the method includes saving the copy of the first object to the selected at least one folder of the user account of the object synchronization service at block 970. For example, the server synchronization service 112 illustrated in FIG. 1A and FIG. 1B may save the copy of the first object to the selected folder of the user account of the object synchronization service 112.

As addressed above, the server synchronization service 112 can provide functionality to share objects including content items and directories. These shared objects can be viewed and edited by user accounts to which the objects are shared. Such sharing, and other collaboration features may only be available through the server synchronization service 112 and are intentionally not provided by the server backup service 114.

According to some examples, the method includes saving any changes to the copy of the first object during the collaboration to the location at the object synchronization service at block 980. For example, the server synchronization service 112 illustrated in FIG. 1A and FIG. 1B may save any changes to the copy of the first object during the collaboration to the location at the object synchronization service. By saving the first object to the server synchronization service 112, various collaboration options can be provided for the copy of the object saved in the server synchronization service 112. In some embodiments, collaboration features include object sharing, commenting on objects, co-working on objects, instant messaging, requesting and receiving signatures, providing presence, and seen state information regarding objects, etc.

The method illustrated in FIG. 9 provides the benefits of the added functionality that users desire from a cloud-based service that stores objects, while maintaining the strict requirements to only backup objects from a source location at the object backup service 114.

However, one possible undesirable effect of the present technology is that of confusing a user. A user that has shared the content item may forget where the copy of the content item is located, or they may become confused as to the nature of the backup service and begin to think that the backup service is allowing changes to objects stored by the backup service. To mitigate these undesirable effects, the user interfaces of at least the backup service are designed to be clear about the purpose and function of the backup service, through labeling indicating the service is a backup service, and labeling contents with copies at the object synchronization service with messages reminding the user that a copy exists.

Figure 12A:
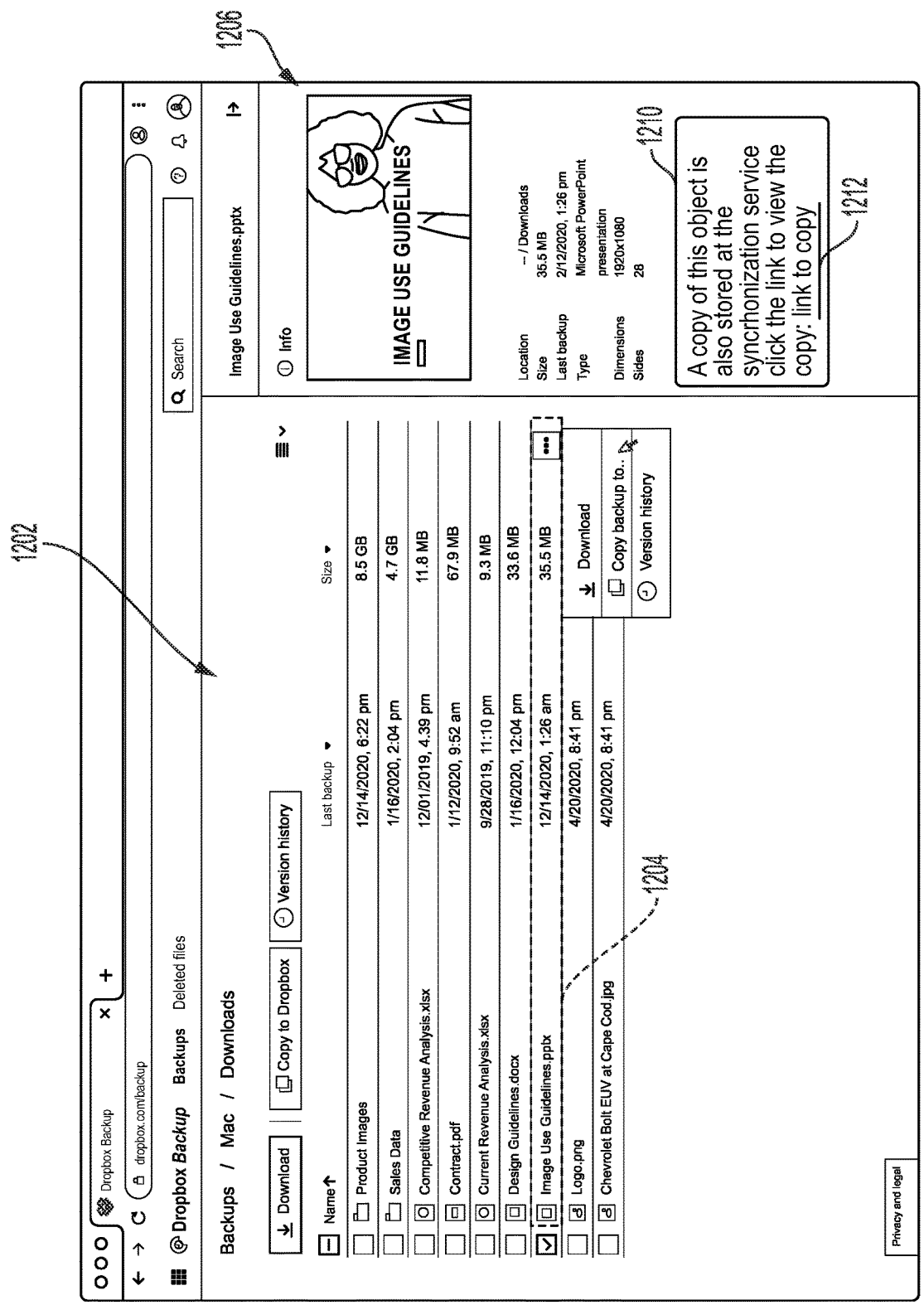
FIG. 12A and FIG. 12B illustrate an object browsing user interface presenting at least one directory of a user account at the object backup service containing the first object along with a visual indication that a copy of the first object exists at the object synchronization service in accordance with some aspects of the present technology.
Figure 12B:
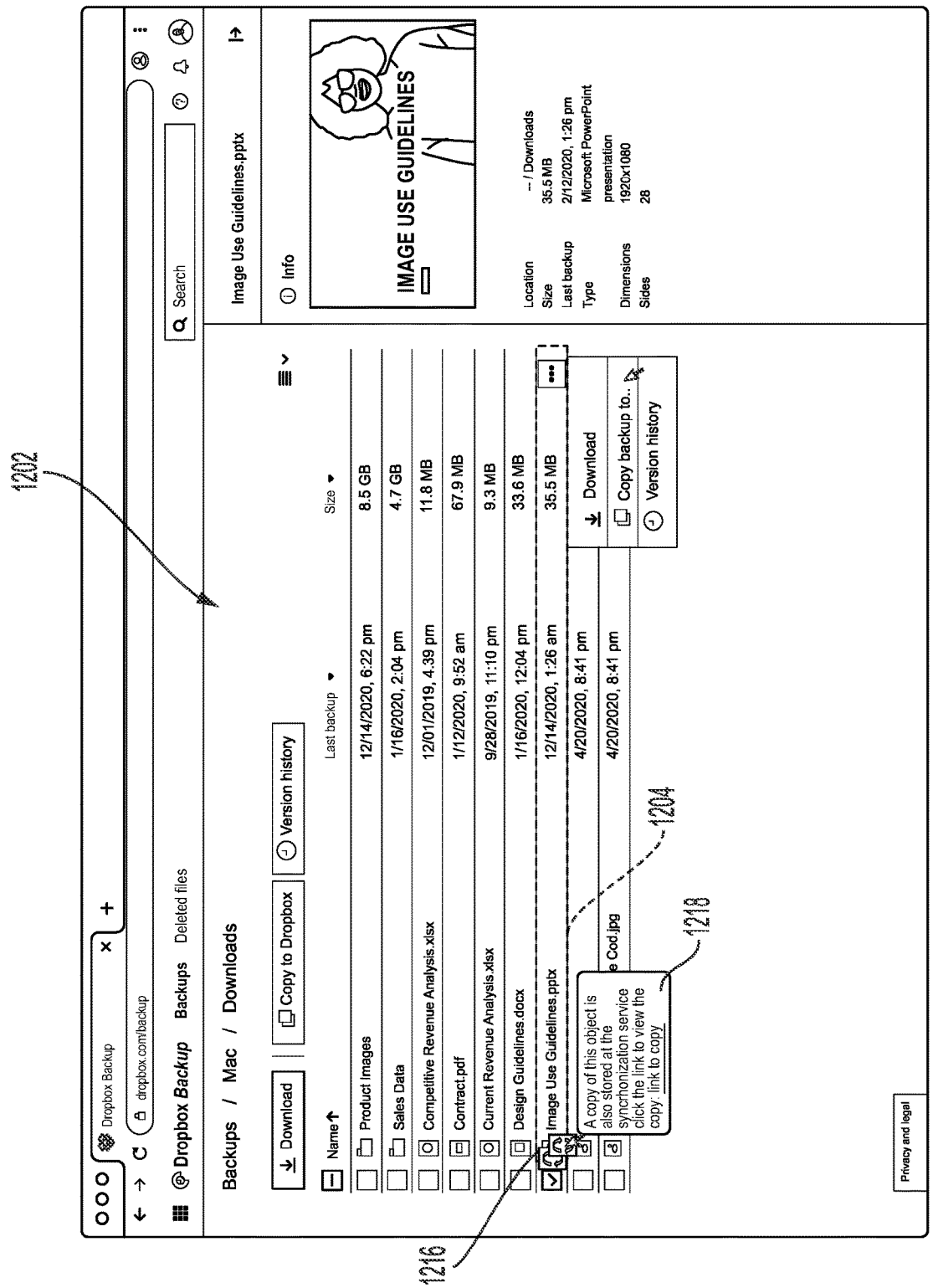

FIG. 12A and FIG. 12B illustrate an object browsing user interface 1202 presenting at least one folder of a user account at the object backup service 114 containing the first object 1204 along with a visual indication that a copy of the first object exists at the object synchronization service. In some embodiments, the visual indication is presented in a side panel 1206 of the object browsing user interface 1202 when the first object 1204 is selected in the object browsing user interface. For example, FIG. 12A shows a message 1210 as the visual indication that informs the user that a copy of the object is stored at the synchronization service. The message can include a link 1212 to the copy of the first object in the object synchronization service.

In another example, FIG. 12B shows that the first object 1204 can be distinguished with an icon 1216 for the first object indicating that a copy of the first object exists. In some embodiments, a message 1218 that informs the user that a copy of the object is stored at the synchronization service can be presented upon mouse-over of the first object 1204 or over the icon 1216, or can be presented in a contextual menu resulting from a right-click on the first object.

While not illustrated, analogous interfaces to those shown in FIG. 12A and FIG. 12B can be provided by the server synchronization service 112. For example, the server synchronization service 112 may cause an object browsing user interface to present at least one folder of a user account of the object synchronization service that includes a copy of the first object. The interface can include a visual indication that the first object at the backup service is a source of the copy of the first object. The visual indication can be presented in a side panel of the object browsing user interface when the copy of the first object is selected in the object browsing user interface, or presented in a contextual menu associated with the copy of the first object that includes an option to view the first object in the object backup service. In some embodiments, the visual indication is a link to the first object in the object backup service. In some embodiments, the visual indication is an icon for the copy of the first object.

Figure 13:
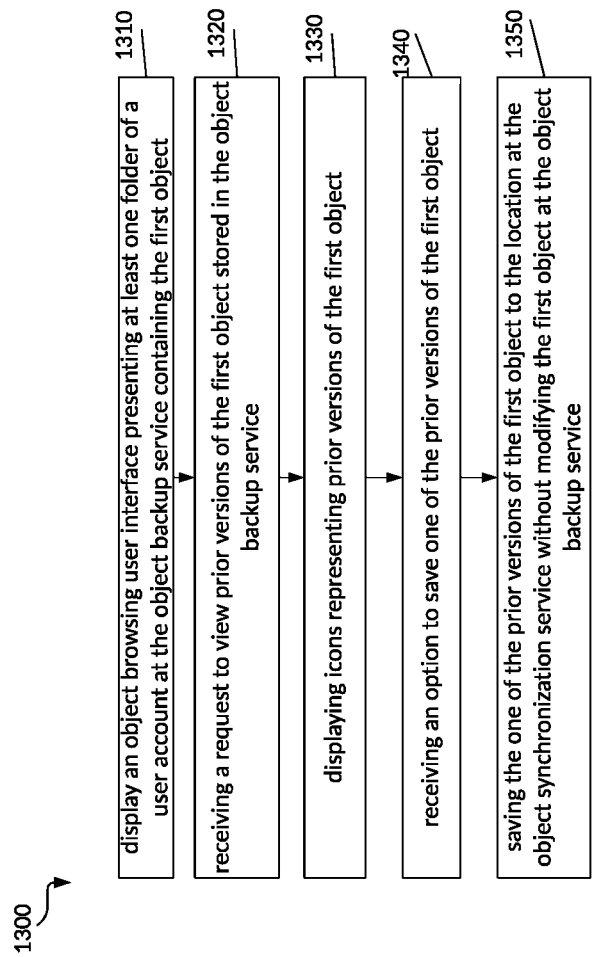
FIG. 13 illustrates an example method for copying a previous version of a backed-up object to the synchronization service in accordance with some aspects of the present technology.

FIG. 13 illustrates an example method 1300 for copying a previous version of a backed-up object to the synchronization service. Although the example method 1300 depicts a particular sequence of operations, the sequence may be altered without departing from the scope of the present disclosure. For example, some of the operations depicted may be performed in parallel or in a different sequence that does not materially affect the function of the method 1300. In other examples, different components of an example device or system that implements the method 1300 may perform functions at substantially the same time or in a specific sequence.

One feature that is commonly associated with backup services is an ability to see previous versions of backed-up objects. If the user wants to keep a previous version of a backed-up object, they need to download the object. It is inconsistent with the functionality of the backup service to create a copy of the backed-up object since the copy is not in the source directory. The present technology can provide a mechanism by which a previous version of a backed-up object can be saved into the synchronization service through interfaces provided by the backup service. Thus, a user can more efficiently and automatically save a previous version of a backed up file.

According to some examples, the method includes causing to display an object browsing user interface presenting at least one folder of a user account at the object backup service containing the first object at block 1310. For example, the object backup service 114 illustrated in FIG. 1A and FIG. 1B may cause an object browsing user interface to present at least one folder of a user account at the object backup service containing the first object.

According to some examples, the method includes receiving a request to view prior versions of the first object stored in the object backup service at block 1320. For example, the object backup service 114 illustrated in FIG. 1A and FIG. 1B may receive a request to view prior versions of the first object stored in the object backup service.

According to some examples, the method includes displaying icons representing prior versions of the first object at block 1330. For example, the object backup service 114 illustrated in FIG. 1A and FIG. 1B may display icons representing prior versions of the first object.

According to some examples, the method includes receiving an option to save one of the prior versions of the first object at block 1340. For example, the object backup service 114 illustrated in FIG. 1A and FIG. 1B may receive an option to save one of the prior versions of the first object.

According to some examples, the method includes saving one of the prior versions of the first object to the location at the object synchronization service without modifying the first object at the object backup service at block 1350. For example, a user can select an option to save a copy of the prior version of the first object from an interface at the backup service. This can cause the object synchronization service 112 illustrated in FIG. 1A and FIG. 1B to save one of the prior versions of the first object to the location at the object synchronization service without modifying the first object at the object backup service.

Figure 14:
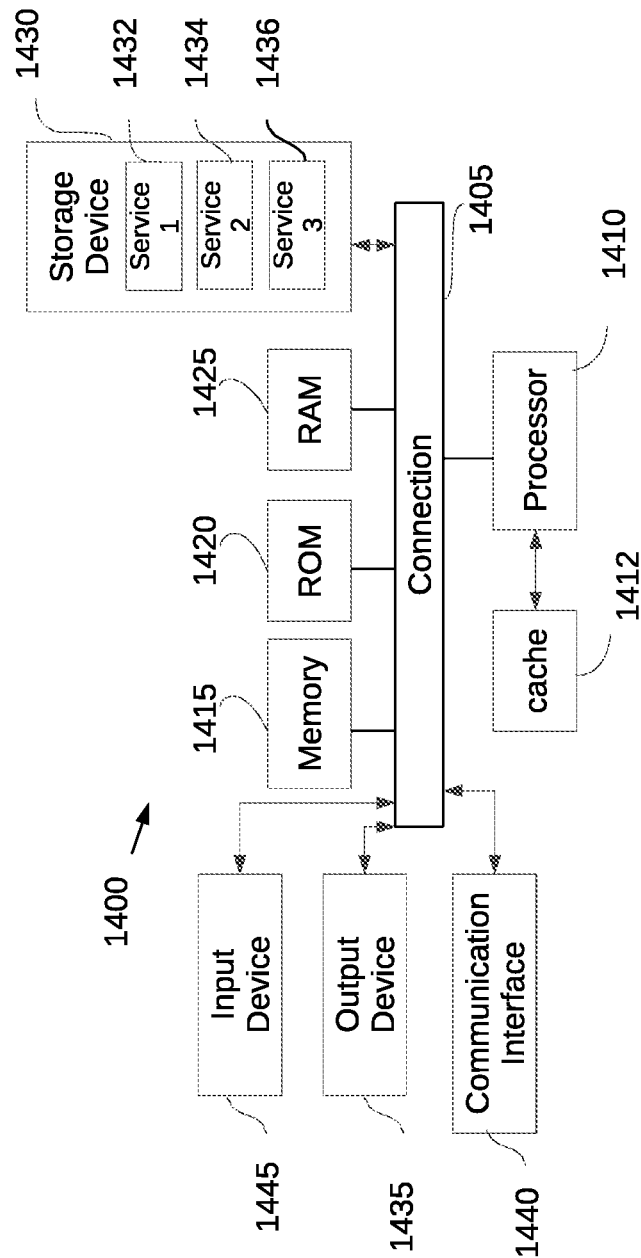
FIG. 14 illustrates an example computing system for implementing some aspects of the present technology.

FIG. 14 shows an example of computing system 1400, which can be for example any computing device making up content management system 110 or client device 150, or any component thereof in which the components of the system are in communication with each other using connection 1405. Connection 1405 can be a physical connection via a bus, or a direct connection into processor 1410, such as in a chipset architecture. Connection 1405 can also be a virtual connection, networked connection, or logical connection.

In some embodiments, computing system 1400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1400 includes at least one processing unit (CPU or processor) 1410 and connection 1405 that couples various system components including system memory 1415, such as read-only memory (ROM) 1420 and random access memory (RAM) 1425 to processor 1410. Computing system 1400 can include a cache of high-speed memory 1412 connected directly with, in close proximity to, or integrated as part of processor 1410.

Processor 1410 can include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms known to those of skill in the art. In some instances, multimodal systems can enable a user to provide multiple types of input/output to communicate with computing system 1400. Computing system 1400 can include communications interface 1440, which can generally govern and manage the user input and system output. There is no restriction on operating on any particular hardware arrangement, and therefore the basic features here may easily be substituted for improved hardware or firmware arrangements as they are developed.

Storage device 1430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1430 can include software services, servers, services, etc., that when the code that defines such software is executed by the processor 1410, it causes the system to perform a function. In some embodiments, a hardware service that performs a particular function can include the software component stored in a computer-readable medium in connection with the necessary hardware components, such as processor 1410, connection 1405, output device 1435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1. A method comprising: receiving a request to share a first object for collaboration, wherein the object backup service is associated with a quality of service parameter that ensures that objects stored within the object backup service, including the first object, are unmodified copies of a source of objects for backup; and calling an API provided by an object synchronization service, wherein the API is configured to copy the first object to a location at the object synchronization service and cause the sharing of the object for the collaboration.

Aspect 2. The method of Aspect 1, further comprising: causing display of a user interface presenting at least one folder of a user account of the object synchronization service; receiving a selection of the at least one folder of the user account of the object synchronization service to which to copying the first object.

Aspect 3. The method of any of Aspects 1 to 2, further comprising: after calling the API, copying the first object; and saving the copy of the first object to the selected at least one folder of the user account of the object synchronization service.

Aspect 4. The method of any of Aspects 1 to 3, further comprising: causing to display an object browsing user interface presenting at least one folder of a user account of the object synchronization service that includes a copy of the first object, wherein the interface includes a visual indication that the first object is a source of the copy of the first object and the first object is stored at the object backup service.

Aspect 5. The method of any of Aspects 1 to 4, wherein the visual indication is a link to the first object in the object backup service, wherein the visual indication is presented in a side panel of the object browsing user interface when the copy of the first object is selected in the object browsing user interface.

Aspect 6. The method of any of Aspects 1 to 5, wherein the visual indication is an icon for the copy of the first object, wherein a contextual menu associated with the copy of the first object includes an option to view the first object in the object backup service.

Aspect 7. The method of any of Aspects 1 to 6, further comprising: causing to display an object browsing user interface presenting at least one folder of a user account at the object backup service containing the first object, wherein the user interface includes a visual indication that a copy of the first object exists at the object synchronization service.

Aspect 8. The method of any of Aspects 1 to 7, wherein the visual indication is a link to the copy of the first object in the object synchronization service, wherein the visual indication is presented in a side panel of the object browsing user interface when the first object is selected in the object browsing user interface.

Aspect 9. The method of any of Aspects 1 to 8, wherein the visual indication is an icon for the first object, wherein a contextual menu associated with the first object includes an option to view the copy of the first object in the object synchronization service.

Aspect 10. The method of any of Aspects 1 to 9, wherein the request to share the first object for collaboration is a request to share the first object with a user, is a request to share the first object with a software service, a request to enter into a synchronized viewing experience for the first object, or a request to send the first object to receive a signature.

Aspect 11. The method of any of Aspects 1 to 10, further comprising: saving any changes to the copy of the first object during the collaboration to the location at the object synchronization service.

Aspect 12. The method of any of Aspects 1 to 11, further comprising: after receiving the request to share the first object for collaboration, presenting a notification informing a user that sharing the first object for collaboration will not affect the first object and that a copy will be stored in an account at the object synchronization service.

Aspect 13. The method of any of Aspects 1 to 12, further comprising: receiving a request to view prior versions of the first object stored in the object backup service; displaying icons representing prior versions of the first object; receiving an option to save one of the prior versions of the first object; after receiving the option to save one of the prior versions of the first object, saving the one of the prior versions of the first object to the location at the object synchronization service without modifying the first object at the object backup service.

What is claimed is:

1. A method comprising:
    backing up a first object from a source of objects for backup to an object backup service of a content management system;
    receiving, at the content management system, a request to share the first object for collaboration, wherein the object backup service is associated with a quality of service parameter that ensures that objects stored within the object backup service, including the first object, are unmodified copies of the source of objects for backup; and
    calling, at the content management system, an API provided by a synchronization service, wherein
    the API is configured to save a copy the first object from the object backup service to a location at the synchronization service and cause the sharing of the first object for the collaboration, and
    the synchronization service is configured at the content management system.

2. The method of claim 1, further comprising:
    causing display of a user interface presenting at least one folder of a user account of the synchronization service;
    receiving a selection of the at least one folder of the user account of the synchronization service to which to copy the first object.

3. The method of claim 2, further comprising:
    after calling the API, copying the first object; and
    saving the copy of the first object to the at least one folder of the user account of the synchronization service.

4. The method of claim 1, further comprising:
    causing to display an object browsing user interface presenting at least one folder of a user account of the synchronization service that includes a copy of the first object, wherein the user interface includes a visual indication that the first object stored at the object backup service is a source of the copy of the first object on the synchronization service.

5. The method of claim 1, further comprising:
    causing to display an object browsing user interface presenting at least one folder of a user account at the object backup service containing the first object, wherein the user interface includes a visual indication that a copy of the first object exists at the synchronization service.

6. The method of claim 1, further comprising:
    saving any changes to the copy of the first object during the collaboration to the location at the synchronization service.

7. The method of claim 1, further comprising:
    after receiving the request to share the first object for collaboration, presenting a notification informing a user that sharing the first object for collaboration will not affect the first object stored at the object backup service and that a copy will be stored in an account at the synchronization service.

8. The method of claim 1, further comprising:
    receiving a request to view prior versions of the first object stored in the object backup service;
    displaying icons representing prior versions of the first object;

receiving an option to save one of the prior versions of the first object;

after receiving the option to save one of the prior versions of the first object, saving the one of the prior versions of the first object to the location at the synchronization service without modifying the first object at the object backup service.

9. A computing system comprising:

a processor; and a memory storing instructions that, when executed by the processor, configure the computing system to:

back up a first object from a source of objects for backup to an object backup service of a content management system;

receive a request to share the first object for collaboration, wherein the object backup service is associated with a quality of service parameter that ensures that objects stored within the object backup service, including the first object, are unmodified copies of the source of objects for backup; and call an API provided by a synchronization service, wherein the API is configured to save a copy the first object directly from the object backup service to a location at the synchronization service and cause the sharing of the first object for the collaboration.

10. The computing system of claim 9, wherein the instructions further configure the computing system to:

cause display of a user interface presenting at least one folder of a user account of the synchronization service;

receive a selection of the at least one folder of the user account of the synchronization service to which to copy the first object.

11. The computing system of claim 10, wherein the instructions further configure the computing system to:

after calling the API, copy the first object; and save the copy of the first object to the at least one folder of the user account of the synchronization service.

12. The computing system of claim 9, wherein the instructions further configure the computing system to:

display an object browsing user interface presenting at least one folder of a user account of the synchronization service that includes the copy of the first object, wherein the interface includes a visual indication that the first object stored at the object backup service is a source of the copy of the first object on the synchronization service.

13. The computing system of claim 9, wherein the instructions further configure the computing system to:

display an object browsing user interface presenting at least one folder of a user account at the object backup service containing the first object, wherein the user interface includes a visual indication that a copy of the first object exists at the synchronization service.

14. The computing system of claim 9, wherein the instructions further configure the computing system to:

save any changes to the copy of the first object during the collaboration to the location at the synchronization service.

15. The computing system of claim 9, wherein the instructions further configure the computing system to:

after receiving the request to share the first object for collaboration, present a notification informing a user that sharing the first object for collaboration will not affect the first object stored at the object backup service and that a copy will be stored in an account at the synchronization service.

16. A non-transitory computer-readable medium comprising instructions stored thereon, that when executed by at least one processor, cause the at least one processor to:

back up a first object from a source of objects for backup to an object backup service of a content management system;

receive a request to share the first object for collaboration, wherein the object backup service is associated with a quality of service parameter that ensures that objects stored within the object backup service, including the first object, are unmodified copies of the source of objects for backup; and call an API provided by a synchronization service, wherein the API is configured to save a copy the first object directly from the object backup service to a location at the synchronization service and cause the sharing of the first object for the collaboration.

17. The non-transitory computer-readable medium of claim 16, wherein the instructions further configure the at least one processor to:

cause display of a user interface presenting at least one folder of a user account of the synchronization service;

receive a selection of the at least one folder of the user account of the synchronization service to which to copy the first object.

18. The non-transitory computer-readable medium of claim 17, wherein the instructions further configure the at least one processor to:

after calling the API, copy the first object; and save the copy of the first object to the at least one folder of the user account of the synchronization service.

19. The non-transitory computer-readable medium of claim 16, wherein the instructions further configure the at least one processor to:

save any changes to the copy of the first object during the collaboration to the location at the synchronization service.

20. The non-transitory computer-readable medium of claim 16, wherein the instructions further configure the at least one processor to:

after receiving the request to share the first object for collaboration, present a notification informing a user that sharing the first object for collaboration will not affect the first object stored at the object backup service and that a copy will be stored in an account at the synchronization service.

* * * * *